US012786738B2

(12) United States Patent
Akl et al.

(10) Patent No.: US 12,786,738 B2
(45) Date of Patent: Nov. 3, 2026

(54) EXTENDING A NON-SERVING CELL BY A REPEATER

(71) Applicant: QUALCOMM Incorporated, San Diego, CA (US)

(72) Inventors: Naeem Akl, Bridgewater, NJ (US); Navid Abedini, Basking Ridge, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 18/325,956

(22) Filed: May 30, 2023

(65) Prior Publication Data

US 2024/0406751 A1 Dec. 5, 2024

(51) Int. Cl.
*H04W 16/26* (2009.01)
*H04W 16/28* (2009.01)

(52) U.S. Cl.
CPC ........... *H04W 16/26* (2013.01); *H04W 16/28* (2013.01)

(58) Field of Classification Search
CPC .............................. H04W 16/26; H04W 16/28
See application file for complete search history.

(56) References Cited

U.S. PATENT DOCUMENTS

2021/0037457 A1 2/2021 Li et al.
2022/0053486 A1* 2/2022 Abedini ............... H04B 7/0696
2025/0168718 A1* 5/2025 Zou .................... H04B 7/06952
2025/0184983 A1* 6/2025 Fujishiro ............... H04L 5/0098

OTHER PUBLICATIONS

International Search Report and Written Opinion—PCT/US2024/029769—ISA/EPO—Sep. 20, 2024.

* cited by examiner

*Primary Examiner* — Sulaiman Nooristany
(74) *Attorney, Agent, or Firm* — Holland & Hart LLP/QUALCOMM Incorporated

(57) ABSTRACT

Methods, systems, and devices for wireless communications are described. A repeater may receive a control signal from a network device indicating that the repeater is to forward one or more messages associated with the non-serving cell of the repeater for a UE. The network device may output the control signal for the repeater. The network device may be a serving cell of the repeater. The network device may additionally output an indication of a beam direction and a time resource associated with the non-serving cell. The repeater may forward the one or more messages associated with the non-serving cell for the UE using the beam direction and via the time resource associated with the non-serving cell in accordance with the control signal.

27 Claims, 18 Drawing Sheets

EXTENDING A NON-SERVING CELL BY A REPEATER

FIELD OF TECHNOLOGY

The following relates to wireless communications, including extending a non-serving cell by a repeater.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support extending a non-serving cell by a repeater. For example, the described techniques provide for a repeater forwarding messages to or from a user equipment (UE) in a wireless communications system. In some cases, the repeater may receive a control signal from a network device indicating that the repeater is to forward one or more messages associated with the non-serving cell of the repeater for a UE. For example, the network device may output the control signal for the repeater. In some examples, the network device may be a serving cell of the repeater. The network device may additionally output an indication of a beam direction and a time resource associated with the non-serving cell. In some cases, the repeater may forward the one or more messages associated with the non-serving cell for (e.g., to or from) the UE using the beam direction and via the time resource associated with the non-serving cell in accordance with the control signal.

DETAILED DESCRIPTION

Figure 1:
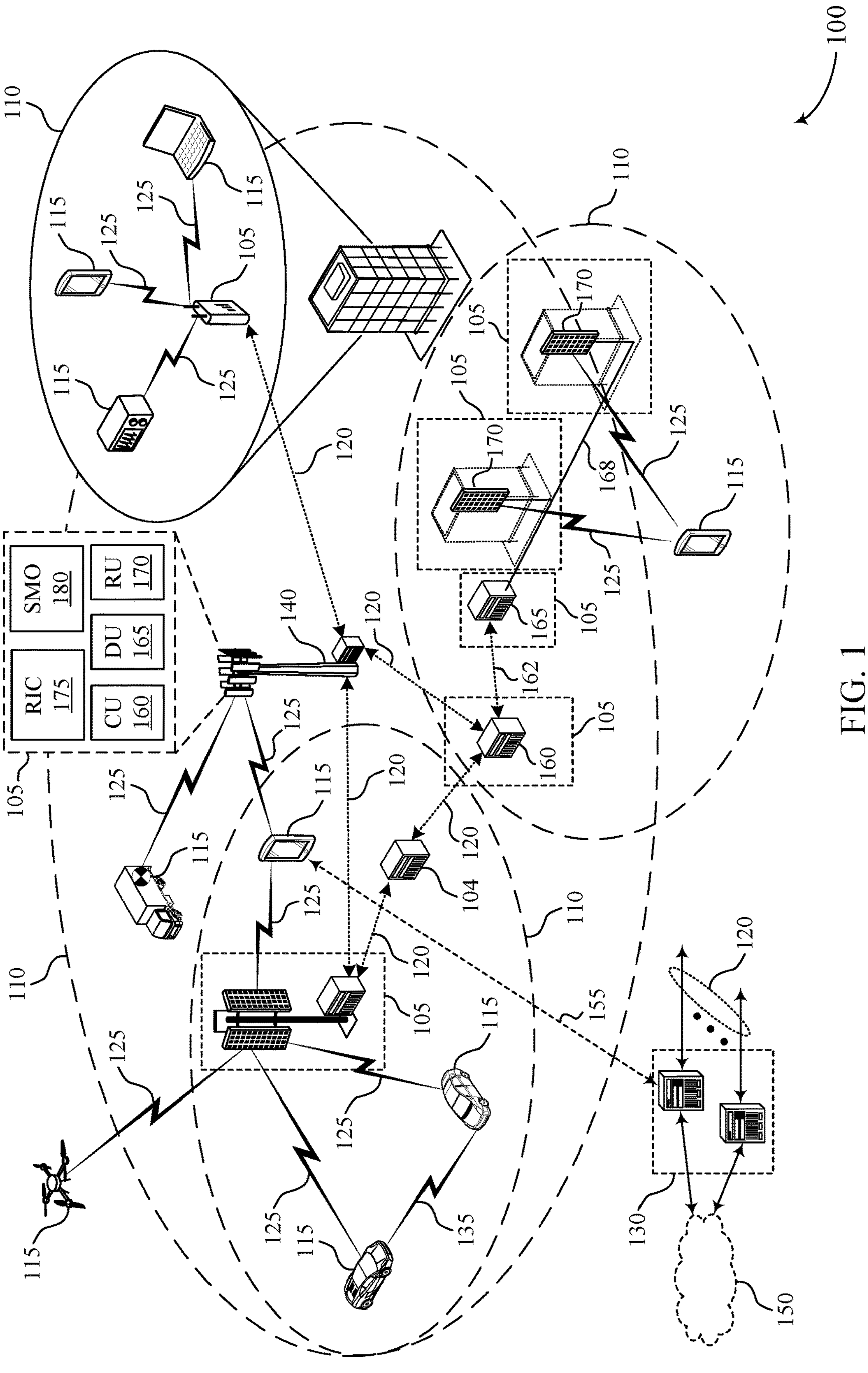
FIG. 1 shows an example of a wireless communications system that supports extending a non-serving cell by a repeater in accordance with one or more aspects of the present disclosure.

A repeater (e.g., an network-controlled repeater (NCR)) may extend a coverage area of a network entity to a non-serving cell. In some cases, a user equipment (UE), an NCR-mobile termination (MT) element, or both may be configured with carrier aggregation. For example, a first cell and a second cell may serve the UE, and the NCR-MT may receive indications via a carrier aggregation framework. In some cases, the carrier aggregation framework may be associated with excessive power consumption for the NCR-MT (e.g., for low traffic levels at the NCR-MT).

Additionally, or alternatively, a network entity (also referred to herein as a network device) may serve a UE via a repeater associated with a first cell (e.g., a serving cell). In some cases, during a handover of the repeater from the first cell to the second cell (e.g., due to link degradation, environmental change, mobility of the repeater, etc.), the repeater may discontinue forwarding signals from the first cell to the UE such that the UE is also handed over from the first cell to the second cell. For example, the UE may have coverage via the repeater and may not communicate with the first cell, the second cell, or both independently. In some cases, the UE may receive the handover command prior to measuring the second cell (e.g., blind handover) such that the handover may be associated with a high likelihood of failure. Accordingly, the UE may receive messages associated with the second cell prior to handover. That is, in some cases, the repeater may forward a signal of the second cell (e.g., a non-serving cell of the NCR-MT of the repeater) to the UE.

The techniques described herein may support extending coverage of a non-serving cell by a repeater. For example, the network entity may transmit control signaling to the repeater, and the repeater may forward messages to or from the non-serving cell for a UE based on the control signaling. In some cases, the network entity may output the control signaling, an indication of a beam direction, an indication of a time resource, or the like to the repeater. In some examples, the repeater may forward the messages for (e.g., to or from) the UE using the beam direction and via the time resource.

Additionally, or alternatively, components of the network entity including a centralized unit (CU) and a distributed unit (DU) may communicate information associated with the extension of coverage. For example, a CU of the network entity may additionally indicate an unavailability of the repeater via the time resource to a DU. In some cases, the DU may indicate assistance information (e.g., including an access beam) by which the CU may generate the indication for one or more messages to be forwarded by the repeater.

Particular aspects of the subject matter described in this disclosure can be implemented to realize one or more of the following potential advantages. In some examples, by supporting a control message indicating that a repeater is to forward messages between a UE and a non-serving cell, the described techniques may support improved signaling coverage, reduced latency, and increased signaling throughput. In addition, a network managing the forwarding of messages by a repeater in this way may enable dynamically-scheduled UEs to communicate with the non-serving cell. Such systems may accordingly experience more efficient signaling and fewer handover procedures, among other benefits.

Aspects of the disclosure are initially described in the context of wireless communications systems. Aspects of the disclosure are then described in the context of a network architecture, additional wireless communications systems, and a process flow. Aspects of the disclosure are further illustrated by and described with reference to apparatus diagrams, system diagrams, and flowcharts that relate to extending a non-serving cell by a repeater.

FIG. 1 shows an example of a wireless communications system 100 that supports extending a non-serving cell by a repeater in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a DU 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support extending a non-serving cell by a repeater as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As described herein, the wireless communications system 100 may provide for extended coverage for a non-serving cell by a repeater. In some cases, the repeater may receive a control signal from a network entity 105 (also referred to herein as a network device) indicating that the repeater is to forward one or more messages associated with the non-serving cell of the repeater for (e.g., to or from) the UE 115. For example, the network entity 105 may output the control signal for the repeater. In some examples, the network entity 105 may be a serving cell of the repeater. The network entity 105 may additionally output an indication of a beam direction and a time resource associated with the non-serving cell. In some cases, the repeater may forward the one or more messages associated with the non-serving cell for the UE 115 using the beam direction and via the time resource associated with the non-serving cell in accordance with the control signal.

The repeater (e.g., NCR) may extend a coverage area of the network entity 105 to a non-serving cell. The repeater may include a mobile termination element (e.g., NCR-MT) and a forwarding element (e.g., NCR-Fwd). In some cases, the mobile termination element may exchange information (e.g., sidelink control information (SCI)) with the network entity 105 via a control link (e.g., a Uu based control link). In some cases, the forwarding element may forward (e.g., perform amplify-and-forward) signals (e.g., uplink or downlink radio frequency signals) between the network entity 105 and the UE 115 via a backhaul link between the network entity 105 and the forwarding element and an access link between the forwarding element and the UE 115. In some examples, at least one carrier of a quantity of carriers associated with the mobile termination element may operate in a same frequency band as the forwarding element. In some cases, the network entity 105, the UE 115, or both may TDM messages on the control link and backhaul link, simultaneously perform transmission and reception on the control link and backhaul link, or both (e.g., according to NCR capability). In some cases, SCI may include beam information for the access link, a TDD configuration (e.g., an uplink or downlink configuration), ON-OFF information, or the like.

In some examples, the SCI may include an access link beam indication. For example, the access link beam indication may include aperiodic (e.g., via DCI) and periodic (e.g., via RRC) indications. Additionally, or alternatively, the access link beam indication may indicate one or more beam indices with associated time resources. In some cases, a beam index may refer to an orbital angular momentum (OAM)—configured access beam.

Additionally, or alternatively, the SCI may include a backhaul beam indication (e.g., a semi-persistent, optional beam indication via a medium access control control element (MAC-CE)). In some cases, the beam index may refer to an RRC-configured beam for the mobile termination element. In some cases, the backhaul beam indication may be based on one or more predefined rules (e.g., such that there is no explicit indication).

In some cases, the SCI may include an ON-OFF indication associated with the forwarding element. For example, an ON state may be indicated (e.g., implicitly) via an access link beam indication. In some cases, the forwarding element may be in an OFF state (e.g., when not indicated as ON or within semi-static flexible symbols).

In some cases, the forwarding element may be associated with TDD information, transmission or reception timing references, or both. For example, the forwarding element may use information associated with the mobile termination element (e.g., such that there is no new SCI).

Additionally, or alternatively, access link beam configuration information may be associated with the forwarding element. For example, an OAM may provide information characterizing beams (e.g., a quantity of beams, spatial information, direction, etc.) to the network device, the repeater, or both.

Figure 2:
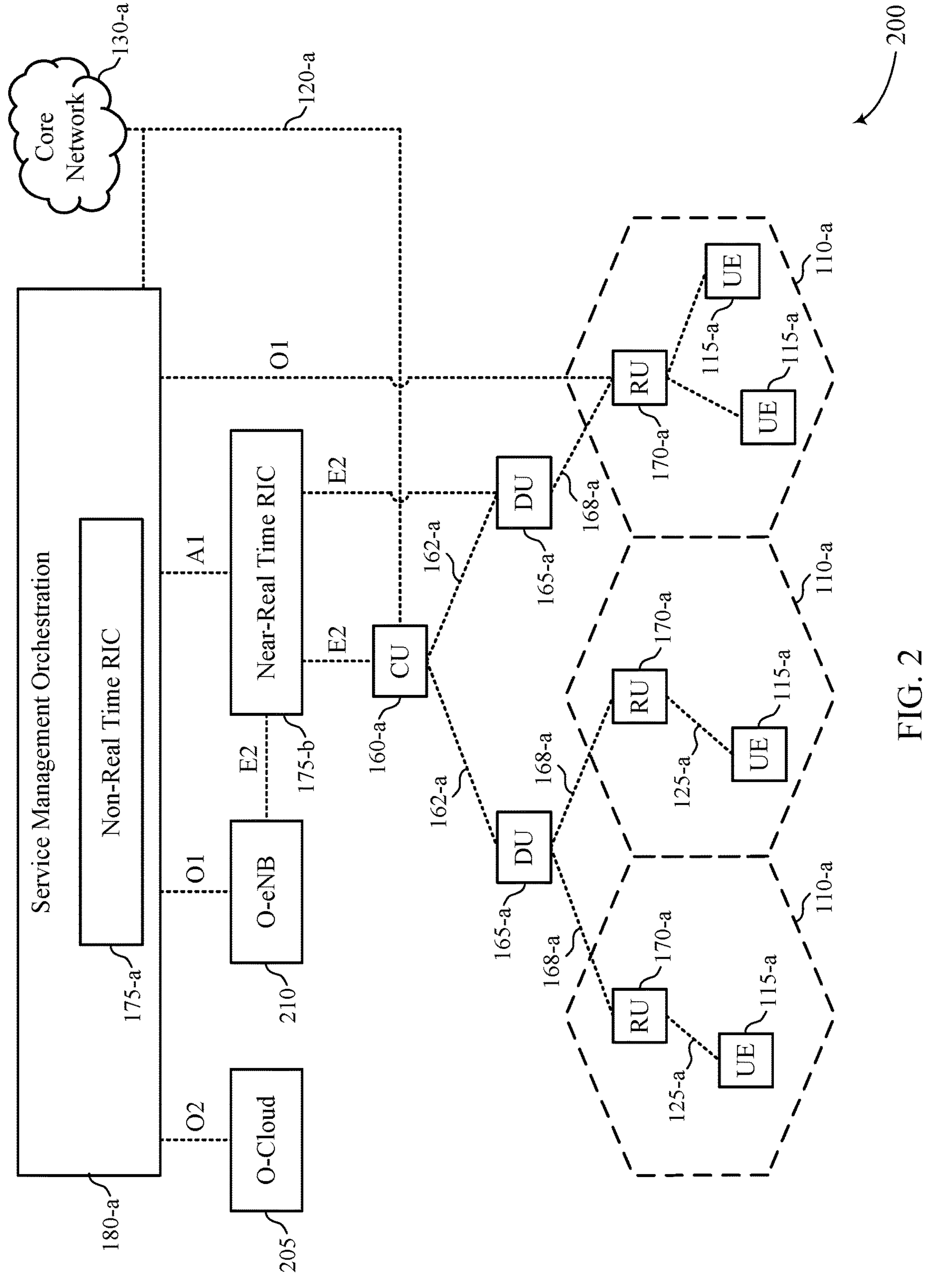
FIG. 2 shows an example of a network architecture that supports extending a non-serving cell by a repeater in accordance with one or more aspects of the present disclosure.

FIG. 2 shows an example of a network architecture 200 (e.g., a disaggregated base station architecture, a disaggregated RAN architecture) that supports extending a non-serving cell by a repeater in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

As described herein, the network architecture 200 may provide for extended coverage for a non-serving cell by a repeater. In some cases, the repeater may receive a control signal from a network entity 105 or a network device (e.g., the CU 160-*a*, the DU 165-*a*, etc.) indicating that the repeater is to forward one or more messages associated with the non-serving cell of the repeater for the UE 115-*a*. For example, the network device may output the control signal for the repeater. In some examples, the network device may be a serving cell of the repeater. The network device may additionally output an indication of a beam direction and a time resource associated with the non-serving cell. In some cases, the repeater may forward the one or more messages associated with the non-serving cell for the UE 115-*a* using the beam direction and via the time resource associated with the non-serving cell in accordance with the control signal.

Figure 3:
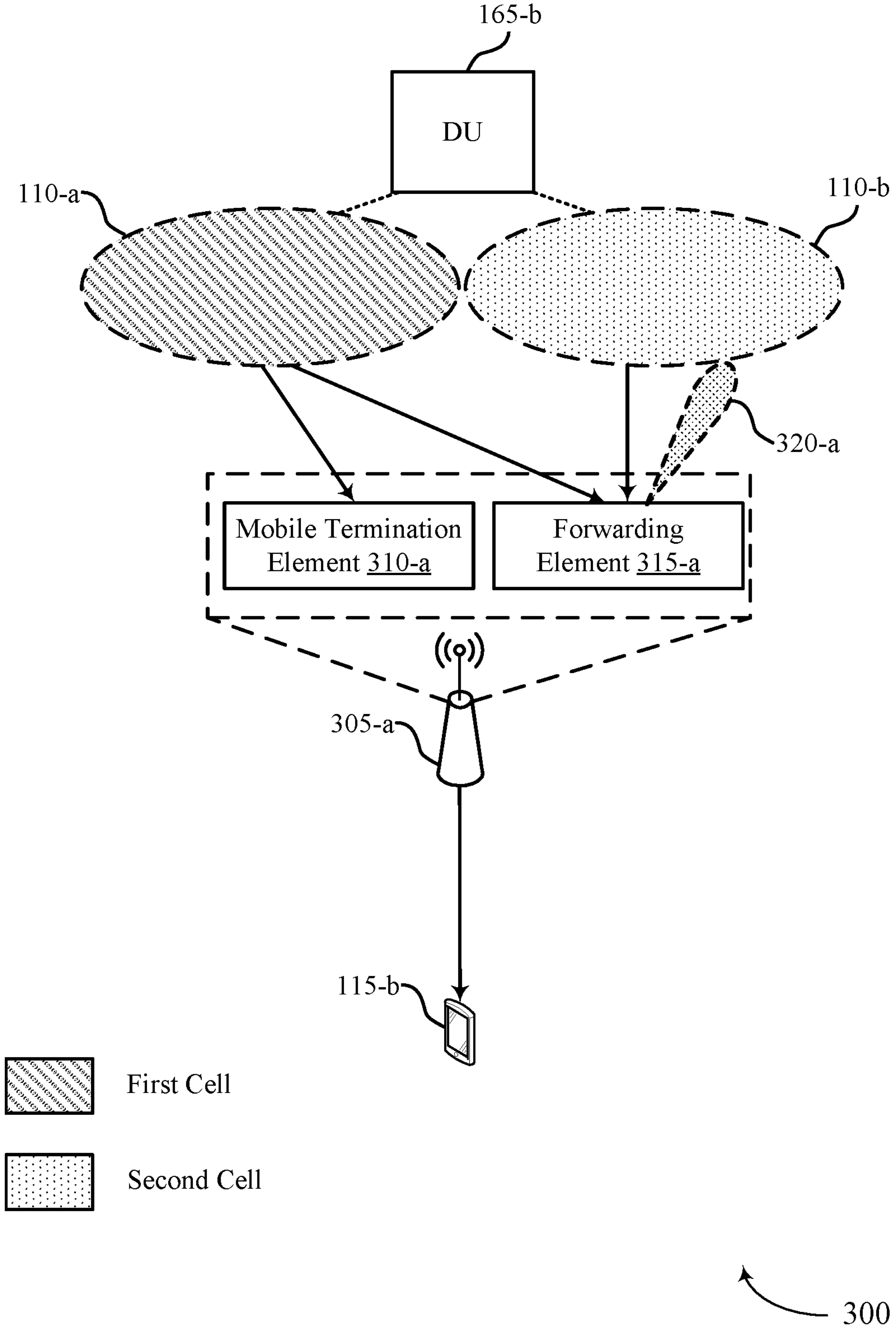
FIGS. 3 through 5 show examples of wireless communications systems that support extending a non-serving cell by a repeater in accordance with one or more aspects of the present disclosure.

FIG. 3 shows an example of a wireless communications system 300 that supports extending a non-serving cell by a repeater in accordance with one or more aspects of the present disclosure. The wireless communications system 300 may implement or be implemented by aspects of the wireless communications system 100 and the network architecture 200. For example, the wireless communications system 300 may include a UE 115-*b*, a DU 165-*b*, a coverage area 110-*a* and a coverage area 110-*b*, which may represent examples of a UE 115, a DU 165, and a coverage area 110, as described with reference to FIGS. 1 and 2.

In some cases, the DU 165-*b* may communicate with the UE 115-*b* via a repeater 305-*a*. For example, the UE 115-*b* may be served by a first cell, a second cell, or both (e.g., configured with carrier aggregation). In some cases, a forwarding element 315-*a* (e.g., NRC-Fwd) of the repeater 305-*a* may forward semi-static signaling (e.g., a synchronization signal block (SSB)), signaling specific to the UE 115-*b*, or both, in downlink and uplink between a network device associated with the DU 165-*b* and the UE 115-*b*. In some examples, a first backhaul beam associated with the first cell may be different than a second backhaul beam (e.g., a backhaul beam 320-*a*) associated with the second cell. For example, the first cell may be associated with a first frequency band while the second cell may be associated with a second frequency band different from the first frequency band. Additionally, or alternatively, a TRP for the first cell and the second cell may not be collocated.

In some examples, a mobile termination element 310-*a* (e.g., NCR-MT) of the repeater 305-*b* may support carrier aggregation. For example, a scheduler may indicate a backhaul beam to the mobile termination element 310-*a* via a carrier aggregation framework where the first cell and the second cell may both be serving cells with respective transmission configuration indicator (TCI) states configured for the mobile termination element 310-*a*.

However, the mobile termination element 310-*a* (e.g., as a UE) may have limited traffic (e.g., OAM traffic) such that a carrier aggregation framework may be associated with excessive power consumption. For example, the mobile termination element 310-*a* may not support carrier aggregation such that power consumption is reduced.

In some cases, the mobile termination element 310-*a* may be configured to receive signals from the first cell (e.g., serving cell). Additionally, or alternatively, the mobile termination element 310-*a* may receive an indication of the backhaul beam 320-*a* associated with the second cell (e.g., non-serving cell). In some cases, the backhaul beam 320-*a* may support uplink messages, downlink messages, or both. Additionally, or alternatively, the backhaul beam 320-*a* may support transmission of SSB, SIB, RACH, or the like. In some examples, the backhaul beam 320-*a* may support transmission of traffic associated with the UE 115-*b* (e.g., channel for an indirect UE).

In some cases, the repeater 305-*a* may determine to forward signals to or from the second cell (e.g., non-serving cell). Additionally, or alternatively, a network device (e.g., the DU 165-*b*) may determine that the repeater 305-*a* is to forward signals to or from the second cell. For example, the network device may determine that the repeater 305-*a* is to forward signals based on the UE 115-*b* being an indirect UE (e.g., dynamically scheduled). In some examples, dynamic scheduling information associated with whether the repeater 305-*a* is scheduled on the first cell (e.g., serving cell) or the second cell (e.g., non-serving cell) may be available to a scheduler, but not the repeater 305-*a*.

Figure 4:
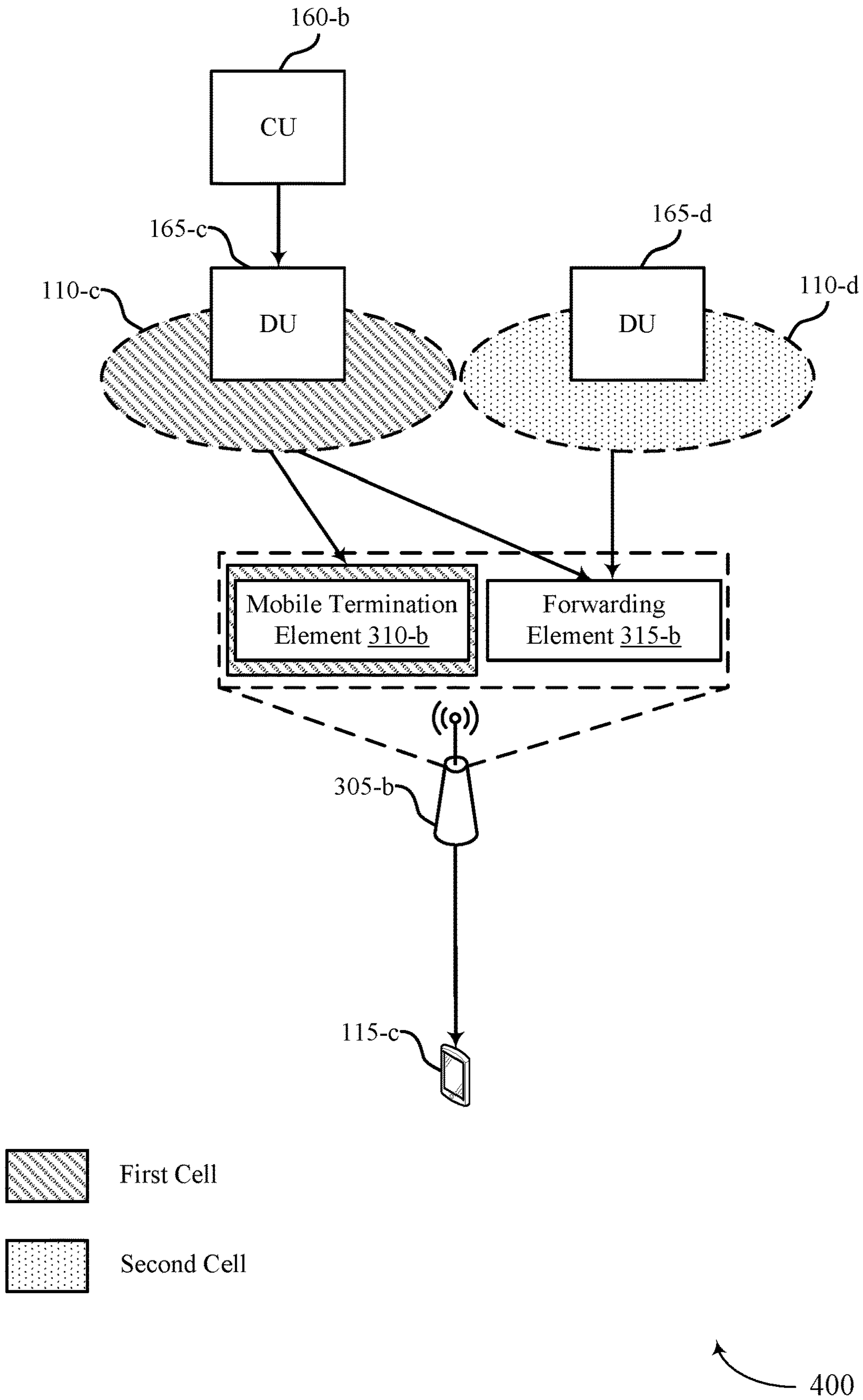

FIG. 4 shows an example of a wireless communications system 400 that supports extending a non-serving cell by a repeater in accordance with one or more aspects of the present disclosure. The wireless communications system 400 may implement or be implemented by aspects of the wireless communications system 100 and the network architecture 200. For example, the wireless communications system 400 may include a UE 115-*c*, a CU 160-*b*, a DU 165-*c*, a DU 165-*d*, a coverage area 110-*c* and a coverage area 110-*d*, which may represent examples of a UE 115, a CU 160, a DU 165, and a coverage area 110, as described with reference to FIGS. 1 and 2.

In some cases, a repeater 305-*b* may extend the coverage area of a first cell with the coverage area 110-*c*. For example, the first cell may be a serving cell for a mobile termination element 310-*b* of the repeater 305-*b*. In some cases, the CU 160-*b* may serve the DU 165-*c*, and the DU 165-*c* may serve the repeater 305-*b*.

In some cases, a forwarding element 315-*b* of the repeater 305-*b* may forward a signal from a second cell (e.g., a non-serving cell) of the mobile termination element 310-*b* with the coverage area 110-*d* to an indirect UE of the second cell. In some examples, the second cell may be served by a same DU, a different DU (e.g., the DU 165-*d*), or a different network device (e.g., a different CU).

In some examples, the mobile termination element 310-*b* may be handed over from the first cell to the second cell (e.g., due to link degradation, environmental change, mobility of the repeater, etc.). In some cases, the repeater 305-*b* may discontinue forwarding signaling from the first cell and the UE 115-*c* such that the UE 115-*c* is also handed over from the first cell to the second cell. For example, the UE 115-*c* may have coverage via the repeater 305-*b* (e.g., the UE may not observe cells independently, with a threshold quality level, etc.).

In some cases, the UE 115-*c* may receive a handover command (e.g., a blind handover command) to hand over to the second cell. For example, the UE 115-*c* may receive the handover command before measuring the second cell such that the handover has a high likelihood of failure (i.e., as opposed to measuring the second cell before handover). In some examples, the UE 115-*c* may receive reference signals (e.g., SSBs) from the second cell (e.g., target cell) while the UE 115-*c* is connected to the first cell (e.g., the source cell). For example, the forwarding element 315-*b* of the repeater 305-*b* may forward reference signals from the second cell to the UE 115-*c* (e.g., during the handover).

In some cases, a network device (e.g., the CU 160-*b*, the DU 165-*c*, the DU 165-*d*) may manage (e.g., control) the extension of a non-serving cell. For example, the network device may transmit SCI to the repeater 305-*b*, and, based on the SCI, the repeater 305-*b* may forward signals to or from the non-serving cell.

In some cases, a measurement report from the mobile termination element 310-*b* of the repeater 305-*b* may indicate multiple neighbor cells. In some examples, the network device may determine a cell of the multiple neighbor cells to which the mobile termination element 310-*b*, the UE 115-*c* (e.g., an indirect UE), or both, may migrate to. For example, the network device may determine the cell based on the measurement report. In some cases, the mobile termination element 310-*b* may receive signaling indicating to forward reference signals of a second cell as opposed to a third cell, where the measurement report may include measurements associated with the second cell, the third cell, or both.

In some cases, the repeater 305-*b* may forward reference signals of a neighbor cell such that indirect UEs (e.g., idle, inactive, etc.) may camp and initiate initial access towards the neighbor cell in accordance with migration of the repeater 305-*b* towards the neighbor cell. In this way, the repeater's movement toward the neighbor cell may enable the UEs to initiate initial access. In some cases, a handover of the UE 115-*c* from the first cell to the second cell may be based on one or more CSI-RSs. For example, a configuration of CSI-RS may be specific to an indirect UE. In some cases, the repeater 305-*b* may receive signaling from the network device indicating resources on which forwarding may be activated (e.g., resources on which CSI-RSs of the second cell may be transmitted).

In some cases, the repeater 305-*b* may be unaware of indirect UEs in a remote access direction while the network device is aware of the indirect UEs. In such cases, the repeater 305-*b* may refrain from forwarding reference signals before the mobile termination element 310-*b* connects to the non-serving cell (e.g., if there are no indirect UEs).

Figure 5:
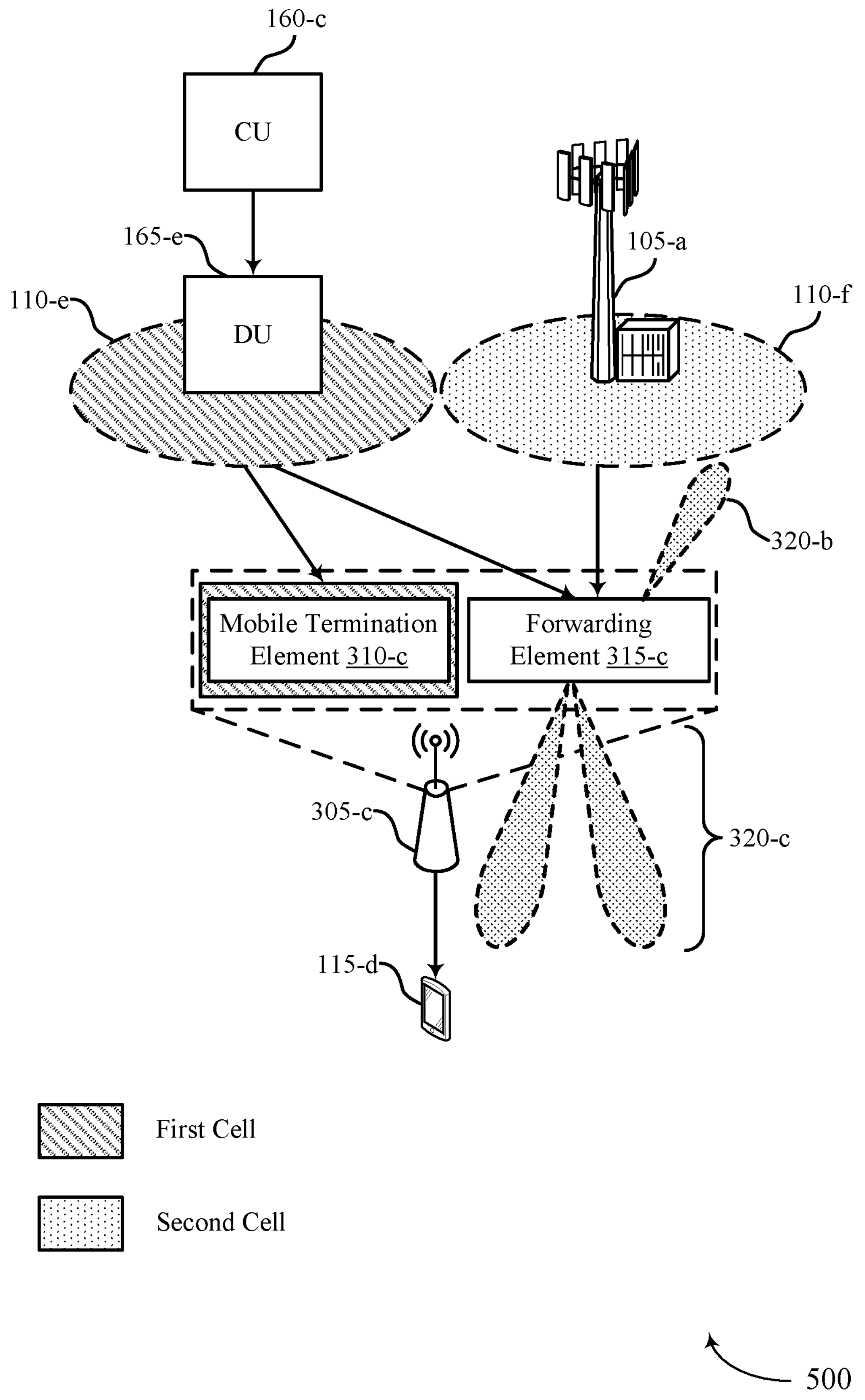

FIG. 5 shows an example of a wireless communications system 500 that supports extending a non-serving cell by a repeater in accordance with one or more aspects of the present disclosure. The wireless communications system 500 may implement or be implemented by aspects of the wireless communications system 100 and the network architecture 200. For example, the wireless communications system 500 may include a UE 115-*d*, a CU 160-*c*, a DU 165-*e*, a network entity 105-*a* a coverage area 110-*e* and a coverage area 110-*f*, which may represent examples of a UE 115, a CU 160, a DU 165, a network entity 105, and a coverage area 110, as described with reference to FIGS. 1 and 2.

In some cases, a repeater 305-*c* may extend the coverage area of a first cell that is associated with the coverage area 110-*e*. For example, the first cell may be a serving cell for a mobile termination element 310-*c* of the repeater 305-*c* (e.g., an NCT-MT). In some cases, a forwarding element 315-*c* of the repeater 305-*c* may forward one or more messages from the DU 165-*e*, the CU 160-*c*, or both to the UE 115-*d* (e.g., via one or more access beams 320-*c*. In some cases, the CU 160-*c* may serve the DU 165-*e*, and the DU 165-*e* may serve the repeater.

In some examples, the repeater 305-*c* may receive an indication from the DU 165-*e* of the first cell (e.g., a serving cell) to forward signaling associated with a second cell (e.g., a non-serving cell) associated with the coverage area 110-*f* to or from the UE 115-*d*. Additionally, or alternatively, the repeater 305-*c* may forward one or more messages from the second cell to or from the UE 115-*d* based on the indication.

For example, the indication may include side control information. In some cases, the side control information may include an indication of a backhaul beam direction for a backhaul beam 320-*b* associated with the second cell. Additionally, or alternatively, the indication of the backhaul beam 320-*b* may include an indication of an identifier of the second cell. For example, the indication may include a beam index of the second cell. Additionally, or alternatively, the indication of the backhaul beam 320-*b* may include a TCI state value associated with a beam (e.g., an access beam) of the second cell. For example, the repeater 305-*c* may receive a configuration of the TCI state associated with the beam of the second cell. In some cases, the beam of the second cell may be an SSB beam, a CSI-RS, a positioning reference signal (PRS), or the like. In some cases, a network device (e.g., the DU 165-*e*) may transmit the indication of the backhaul beam 320-*b* to the repeater 305-*c* via dynamic signaling.

In some examples, the side control information may include a communication resource (e.g., a time resource) on which the repeater 305-*c* may direct the backhaul beam 320-*b* towards the second cell. In some cases, the network device or the DU 165-*e* may transmit (or output) the indication of the communication resource to the repeater 305-*c* via an RRC message, a dynamic indication of an RRC configured pattern, or the like.

In some cases, the side control information may include a direction of forwarding (e.g., uplink or downlink) to or from the second cell. For example, the direction may indicate that the repeater 305-*c* is to forward messages from the network entity 105-*a* of the second cell to the UE 115-*d* or from the UE 115-*d* to the second cell. In some cases, the network device may transmit the indication of the direction of forwarding via an RRC message or SIB of the second cell. In some cases, the repeater 305-*c* may report measurements (e.g., an L3 measurement report, an L1 measurement report, etc.) of the second cell to the DU 165-*e*, the CU 160-*c*, or both. For example, the DU 165-*e*, the CU 160-*c*, or both may transmit the indication based on the measurements of the second cell reported by the repeater 305-*c*. In some cases, the repeater may receive the indication via RRC signaling, a MAC-CE, DCI, a SIB, or a combination thereof. For example, the repeater may receive the indication via dynamic signaling (e.g., DCI).

In some cases, an RRC message may configure the repeater 305-*c* semi-statically. For example, the RRC message may configure the repeater 305-*c* with forwarding associated with the second cell without involvement of the DU 165-*e*. In some cases, the CU 160-*c* may output an indication to the repeater 305-*c* to forward signaling associated with the second cell on a time resource. Additionally, or alternatively, the CU 160-*c* may output an indication of unavailability of the repeater 305-*c* to the DU 165-*e* on the time resource.

In some examples, the RRC message may configure one or more access beams 320-*c*. For example, the RRC message may configure a direction for an access beam of the one or more access beams 320-*c* for a time resource on which the repeater 305-*c* may forward messages associated with the second cell. Additionally, or alternatively, the DU 165-*e* may output assistance information to the CU 160-*c*. For example, the DU 165-*e* may output assistance information to the CU 160-*c* based on the DU 165-*e* being aware that the UE 115-*d* is served by the access beam of the one or more access beams 320-*c*. That is, in some examples, the DU 165-*e* may indicate the access beam of the one or more access beams 320-*c* associated with forwarding signaling of the second cell to the CU 160-*c*, where the CU 160-*c* may generate the indication based on the assistance information received from the DU 165-*c*. In some cases, the indication of the access beam may be associated with the UE 115-*d* or not associated with the UE 115-*d* (e.g., device agnostic). Additionally, or alternatively, the indication of the access beam may include a time resource.

In some cases, the network device may transmit the indication via a MAC-CE, DCI, or both. For example, the network device may transmit the MAC-CE, DCI, or both based on a trigger message (e.g., a F1AP trigger) output from the CU 160-*c* to the DU 165-*e* (e.g., when the indication may be based on L3 measurement reports). In some cases, the CU 160-*c* may output the indication or part of the indication to the DU 165-*e*, and the DU 165-*e* may transmit the indication to the mobile termination element 310-*c*.

Figure 6:
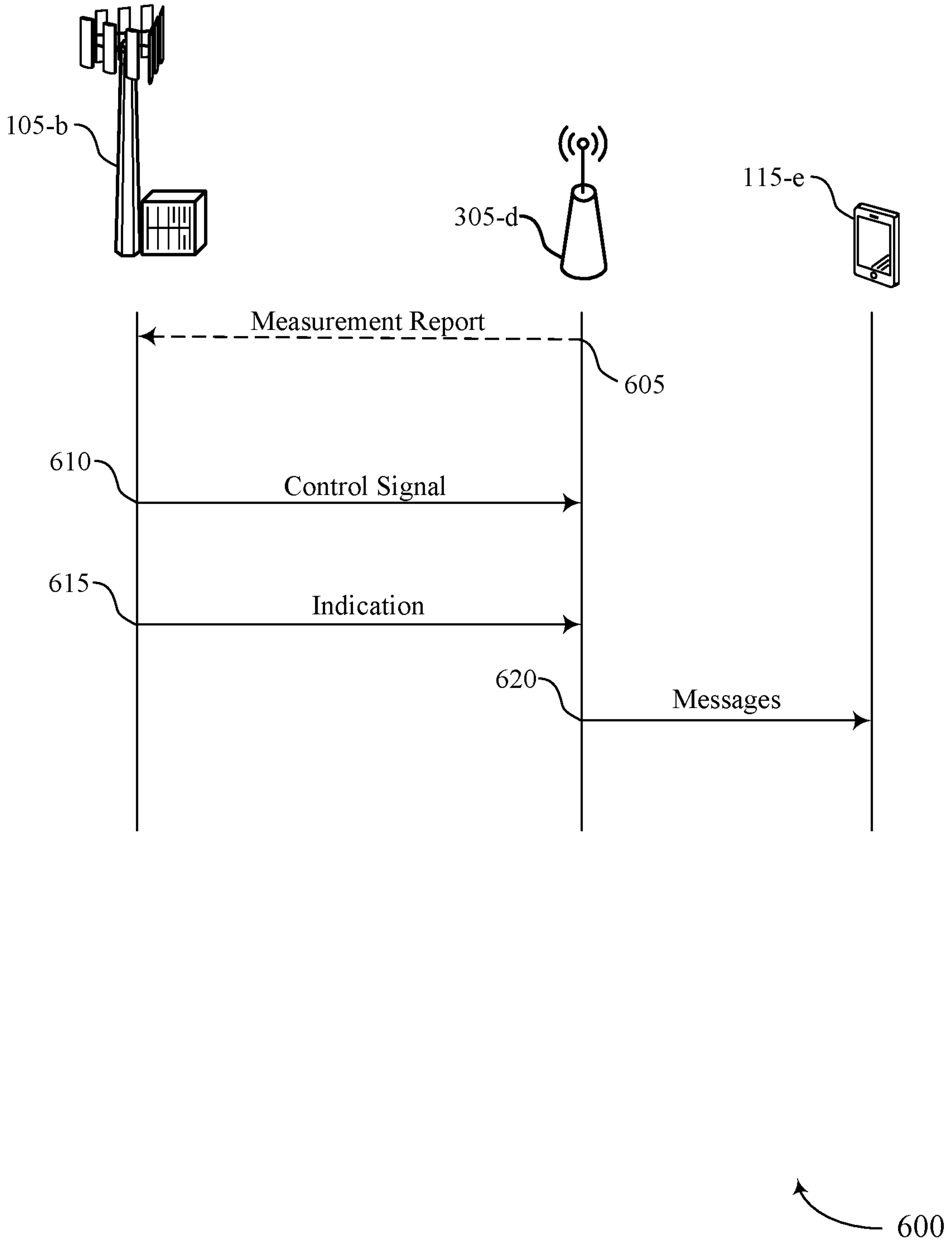
FIG. 6 shows an example of a process flow that supports extending a non-serving cell by a repeater in accordance with one or more aspects of the present disclosure.

FIG. 6 shows an example of a process flow 600 that supports extending a non-serving cell by a repeater in accordance with one or more aspects of the present disclosure. In some examples, the process flow 600 may implement or be implemented by aspects of the wireless communications system 100, the network architecture 200, the wireless communications system 300, the wireless communications system 400, the wireless communications system 500, or any combination thereof. For example, the process flow 600 may include a network entity 105-*b*, a repeater 305-*d*, and a UE 115-*e* which may be an example of corresponding devices herein as described in FIGS. 1, 2, and 3. Alternative examples of the following may be implemented, where some steps are performed in a different order than described or are not performed at all. In some cases, steps may include additional features not mentioned below, or further steps may be added. Although the network entity 105-*b*, the repeater 305-*d*, and the UE 115-*e* are shown performing the operations of the process flow 600, some aspects of some operations may also be performed by one or more other wireless devices.

At 605, the repeater 305-*d* may transmit a measurement report to the network entity 105-*b*. For example, the repeater

305-*d* may transmit a report indicating one or more measurements associated with a serving cell. The report may be an L1 measurement report or an L3 measurement report.

At 610, the network entity 105-*b* may transmit a control signal to the repeater 305-*d* indicating that the repeater 305-*d* is to forward one or more messages associated with a non-serving cell of the repeater 305-*d* for a UE 115-*e*. In some cases, the network entity 105-*b* may be the serving cell of the repeater 305-*d*. In some cases, the repeater 305-*d* may receive the control information based on the measurement report. In some cases, the network entity 105-*b* may be a DU. In some examples, the DU may obtain an indication from a CU of the network entity 105-*b* that the one or more messages are to be forwarded for the UE 115-*e*. Additionally, or alternatively, the DU may output a MAC-CE for the repeater 305-*d* indicating that the one or more messages are to be forwarded for the UE 115-*e* based on obtaining the indication.

At 615, the network entity 105-*b* may transmit, to the repeater 305-*d*, an indication of a beam direction associated with the non-serving cell, an indication of the time resource, or both. Additionally, or alternatively, the indication may include an identifier associated with the non-serving cell, a beam index associated with the non-serving cell, or both.

In some examples, the indication may include a value of a TCI state associated with a beam of the non-serving cell. In some cases, the beam of the non-serving cell may be associated with one or more of a SSB, a CSI-RS, or a PRS. Additionally, or alternatively, the repeater 305-*d* may receive an indication of a configuration of the TCI state associated with the beam of the non-serving cell. For example, forwarding the one or more messages may be based on the configuration. In some cases, the indication may be an indication of an access beam associated with the non-serving cell. In some examples, the one or more messages are forwarded to the UE 115-*e* using the access beam. In some cases, the indication may be an indication of direction of the forwarding. In some examples, the direction may indicate that the repeater 305-*d* is to transmit the one or more messages to the UE 115-*e* or receive the one or more messages from the UE 115-*e*. In some examples, the CU may obtain assistance information from the DU indicating an access beam associated with the non-serving cell. Additionally, or alternatively, the CU may generate the indication that the one or more messages are to be forwarded for the UE 115-*e* based on the assistance information.

At 620, the repeater 305-*d* may forward messages from the network entity 105-*b* to the UE 115-*e*. For example, the repeater 305-*d* may forward the one or more messages associated with the non-serving cell for the UE 115-*e* via a time resource associated with the non-serving cell in accordance with the control signal. That is, the repeater 305-*d* may forward messages from the non-serving cell to the UE 115-*e* or from the UE 115-*e* to the non-serving cell.

Figure 7:
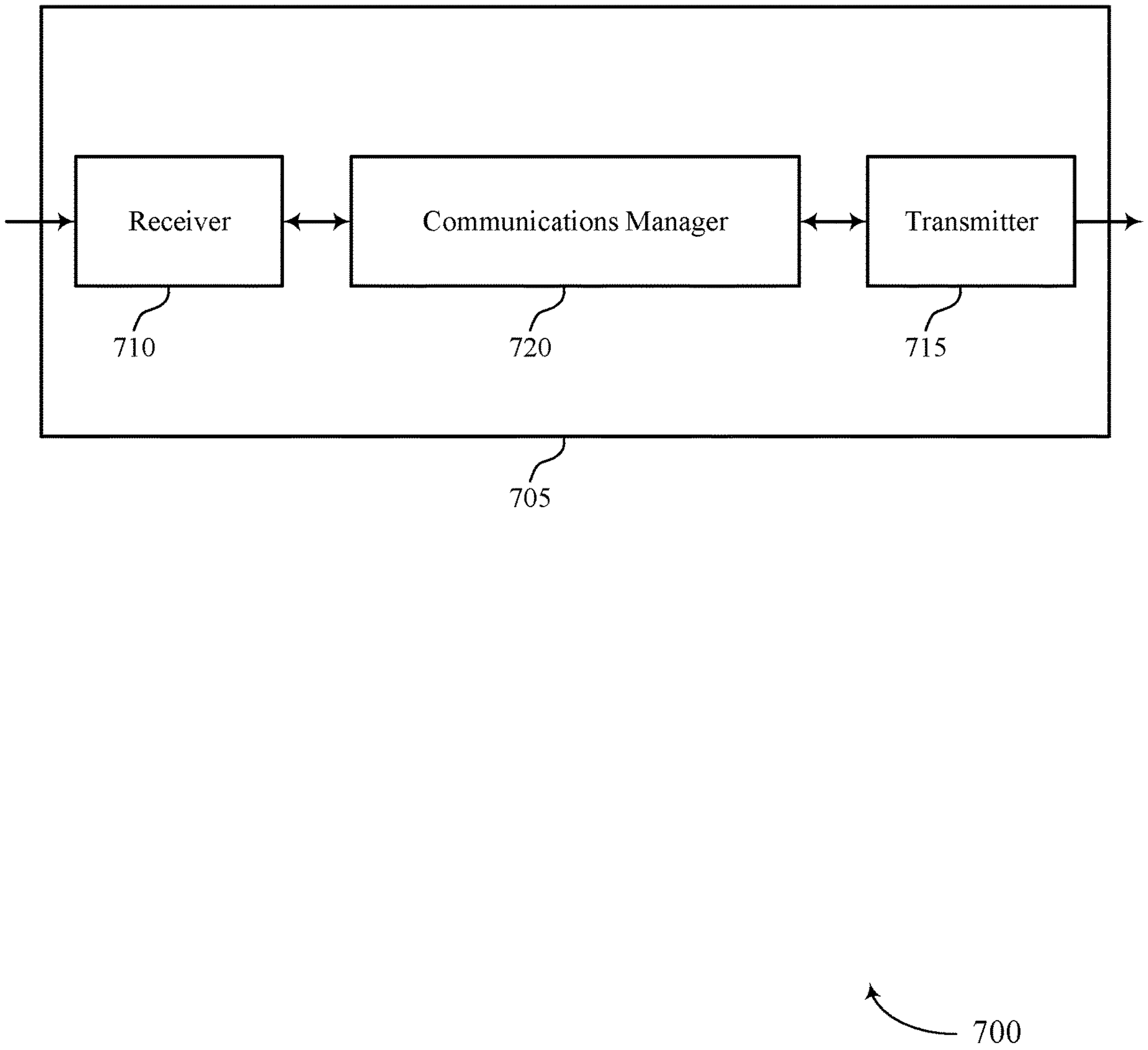
FIGS. 7 and 8 show block diagrams of devices that support extending a non-serving cell by a repeater in accordance with one or more aspects of the present disclosure.

FIG. 7 shows a block diagram 700 of a device 705 that supports extending a non-serving cell by a repeater in accordance with one or more aspects of the present disclosure. The device 705 may be an example of aspects of a repeater wireless device as described herein. The device 705 may include a receiver 710, a transmitter 715, and a communications manager 720. The device 705 may also include at least one processor. Each of these components may be in communication with one another (e.g., via one or more buses).

The receiver 710 may provide a means for receiving information such as packets, user data, control information, or any combination thereof associated with various information channels (e.g., control channels, data channels, information channels related to extending a non-serving cell by a repeater). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to extending a non-serving cell by a repeater). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of extending a non-serving cell by a repeater as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include at least one processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, in some examples, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a repeater wireless device in accordance with examples as disclosed herein. For example, the communications manager 720 is capable of, configured to, or operable to support a means for receiving, from a network device, a control signal indicating that the repeater wireless device is to forward one or more messages associated with a non-serving cell of the repeater wireless device for a UE, where the network device is a serving cell of the repeater wireless device. The communications manager 720 is capable of, configured to, or operable to support a means for forwarding the one or more messages associated with the non-serving cell for the UE via a time resource associated with the non-serving cell in accordance with the control signal.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for extending a non-serving cell by a repeater, which may improve communication reliability, improve communication resource utilization efficiency, reduce latency, improve device coverage, and increase signaling throughput.

Figure 8:
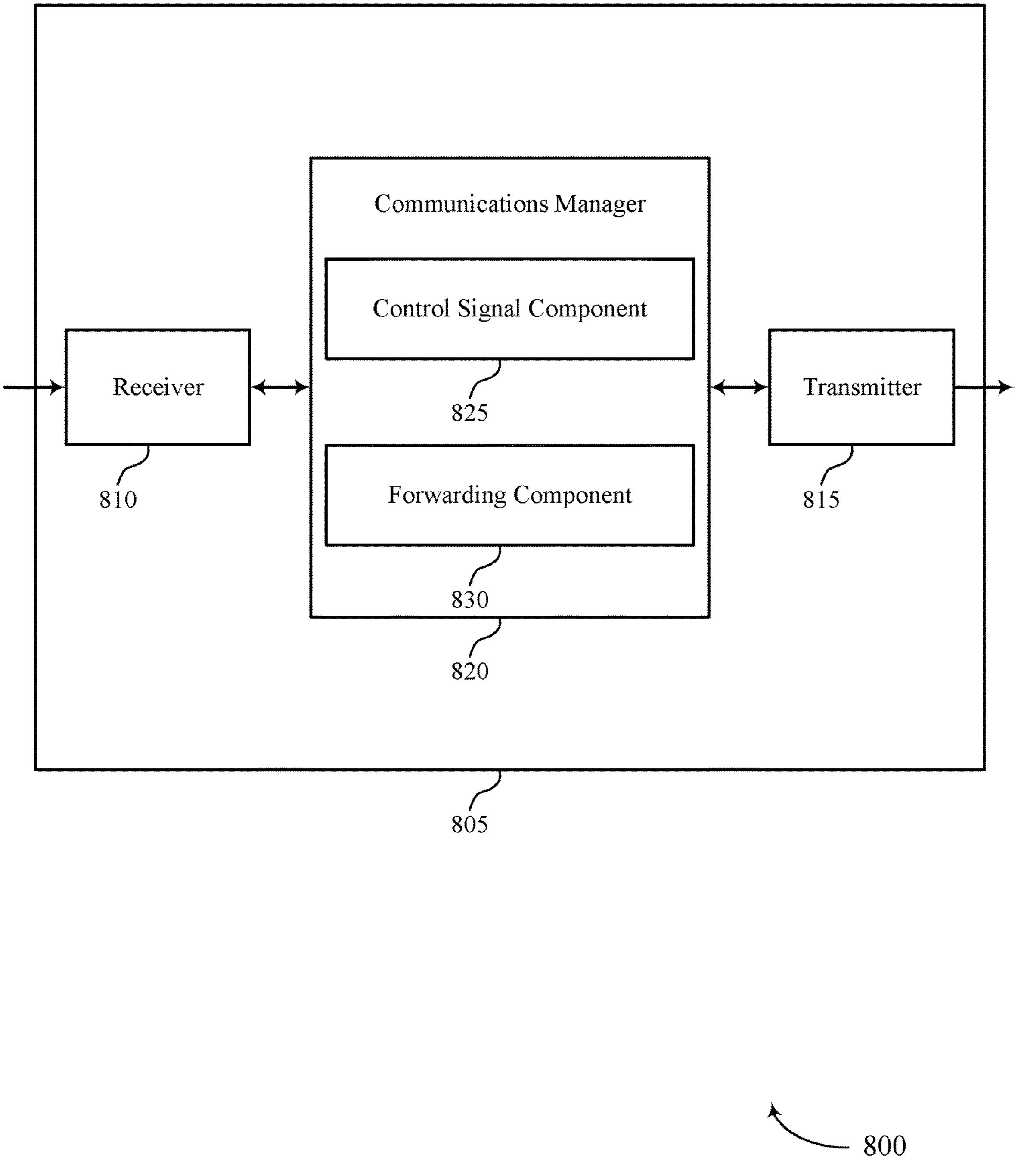

FIG. 8 shows a block diagram 800 of a device 805 that supports extending a non-serving cell by a repeater in accordance with one or more aspects of the present disclosure. The device 805 may be an example of aspects of a device 705 or a repeater wireless device 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to extending a non-serving cell by a repeater). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to extending a non-serving cell by a repeater). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of extending a non-serving cell by a repeater as described herein. For example, the communications manager 820 may include a control signal component 825 a forwarding component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a repeater wireless device in accordance with examples as disclosed herein. The control signal component 825 is capable of, configured to, or operable to support a means for receiving, from a network device, a control signal indicating that the repeater wireless device is to forward one or more messages associated with a non-serving cell of the repeater wireless device for a UE, where the network device is a serving cell of the repeater wireless device. The forwarding component 830 is capable of, configured to, or operable to support a means for forwarding the one or more messages associated with the non-serving cell for the UE via a time resource associated with the non-serving cell in accordance with the control signal.

Figure 9:
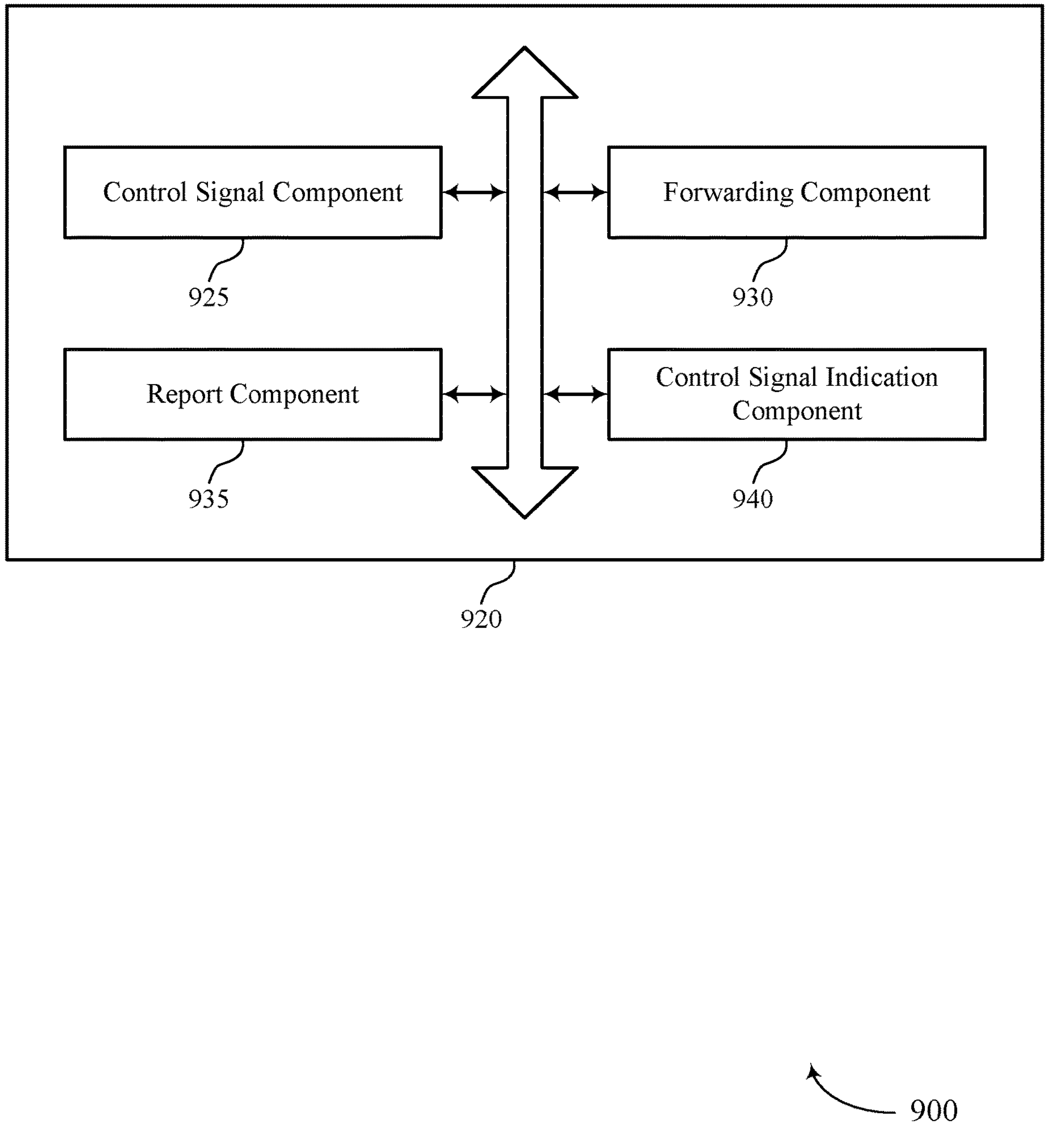
FIG. 9 shows a block diagram of a communications manager that supports extending a non-serving cell by a repeater in accordance with one or more aspects of the present disclosure.

FIG. 9 shows a block diagram 900 of a communications manager 920 that supports extending a non-serving cell by a repeater in accordance with one or more aspects of the present disclosure. The communications manager 920 may be an example of aspects of a communications manager 720, a communications manager 820, or both, as described herein. The communications manager 920, or various components thereof, may be an example of means for performing various aspects of extending a non-serving cell by a repeater as described herein. For example, the communications manager 920 may include a control signal component 925, a forwarding component 930, a report component 935, a control signal indication component 940, or any combination thereof. Each of these components may communicate, directly or indirectly, with one another (e.g., via one or more buses).

The communications manager 920 may support wireless communications at a repeater wireless device in accordance with examples as disclosed herein. The control signal component 925 is capable of, configured to, or operable to support a means for receiving, from a network device, a control signal indicating that the repeater wireless device is to forward one or more messages associated with a non-serving cell of the repeater wireless device for a UE, where the network device is a serving cell of the repeater wireless device. The forwarding component 930 is capable of, configured to, or operable to support a means for forwarding the one or more messages associated with the non-serving cell for the UE via a time resource associated with the non-serving cell in accordance with the control signal.

In some examples, the report component 935 is capable of, configured to, or operable to support a means for transmitting, to the network device, a report indicating one or more measurements associated with the serving cell, where receiving the control signal is based on the report.

In some examples, to support receiving the control signal, the control signal indication component 940 is capable of, configured to, or operable to support a means for receiving an indication of a beam direction associated with the non-serving cell and an indication of the time resource. In some examples, the indication includes an identifier associated with the non-serving cell and a beam index associated with the non-serving cell.

In some examples, the indication includes a value of a TCI state associated with a beam of the non-serving cell. In some examples, the beam of the non-serving cell is associated with one or more of a SSB, a CSI-RS, or a PRS.

In some examples, the control signal indication component 940 is capable of, configured to, or operable to support a means for receiving an indication of a configuration of the TCI state associated with the beam of the non-serving cell, where forwarding the one or more messages is based on the configuration.

In some examples, to support receiving the control signal, the control signal indication component 940 is capable of, configured to, or operable to support a means for receiving an indication of an access beam associated with the non-serving cell, where the one or more messages are forwarded to the UE using the access beam.

In some examples, to support receiving the control signal, the control signal indication component 940 is capable of, configured to, or operable to support a means for receiving an indication of direction of the forwarding, where the direction indicates that the repeater wireless device is to transmit the one or more messages to the UE or receive the one or more messages from the UE.

Figure 10:
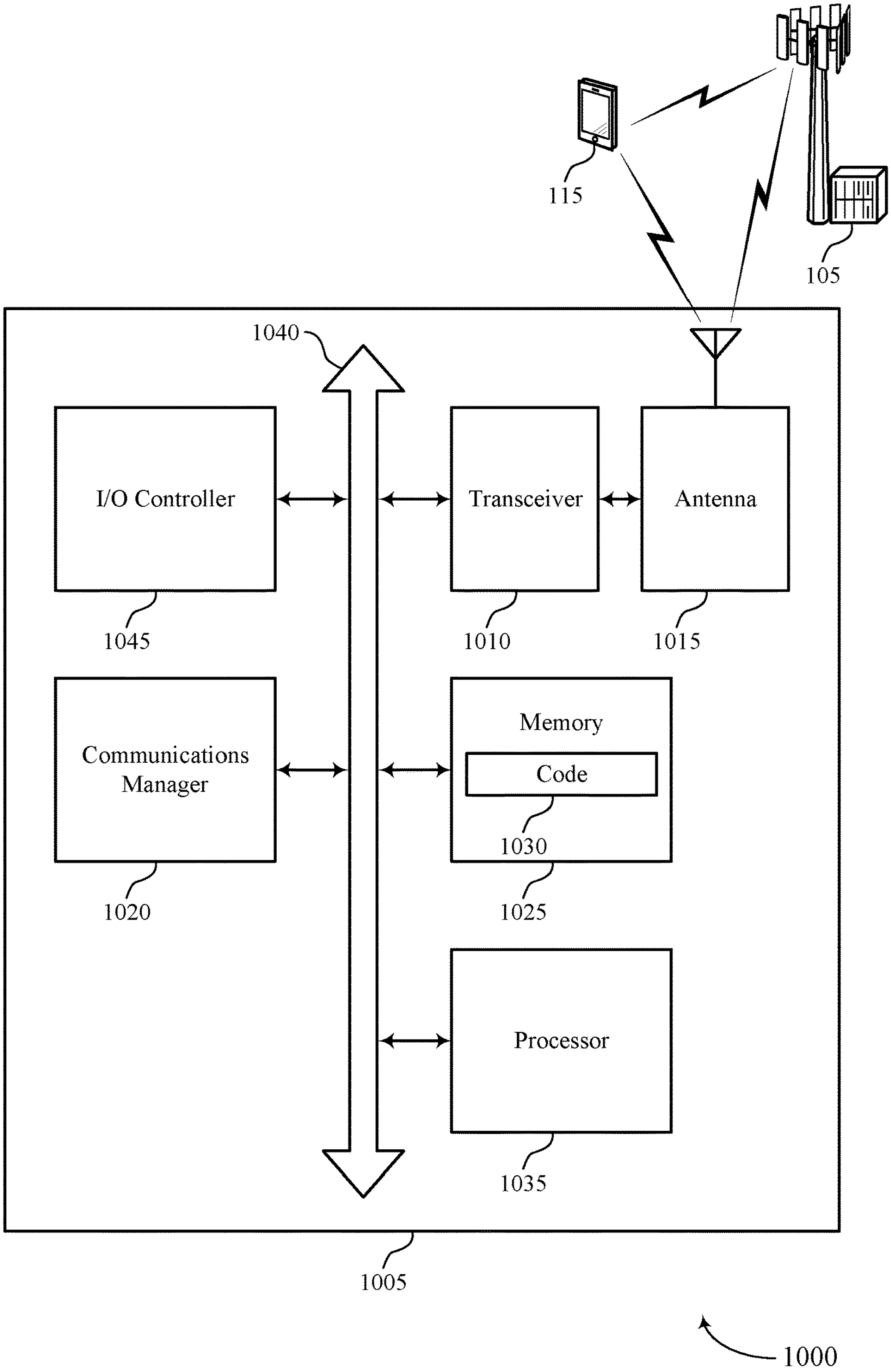
FIG. 10 shows a diagram of a system including a device that supports extending a non-serving cell by a repeater in accordance with one or more aspects of the present disclosure.

FIG. 10 shows a diagram of a system 1000 including a device 1005 that supports extending a non-serving cell by a repeater in accordance with one or more aspects of the present disclosure. The device 1005 may be an example of or include the components of a device 705, a device 805, or a repeater wireless device as described herein. The device 1005 may include components for bi-directional voice and data communications including components for transmitting and receiving communications, such as a communications manager 1020, a transceiver 1010, an antenna 1015, a at least one memory 1025, code 1030, at least one processor 1035, and an I/O controller 1045. These components may be in electronic communication or otherwise coupled (e.g., operatively, communicatively, functionally, electronically, electrically) via one or more buses (e.g., a bus 1040).

In some cases, the device 1005 may include a single antenna 1015. However, in some other cases, the device 1005 may have more than one antenna 1015, which may be capable of concurrently transmitting or receiving multiple wireless transmissions. The transceiver 1010 may communicate bi-directionally, via the one or more antennas 1015, wired, or wireless links as described herein. For example, the transceiver 1010 may represent a wireless transceiver and may communicate bi-directionally with another wireless transceiver. The transceiver 1010 may also include a modem to modulate the packets, to provide the modulated packets to one or more antennas 1015 for transmission, and to demodulate packets received from the one or more antennas 1015. The transceiver 1010, or the transceiver 1010 and one or more antennas 1015, may be an example of a transmitter 715, a transmitter 815, a receiver 710, a receiver 810, or any combination thereof or component thereof, as described herein.

The at least one memory 1025 may include RAM and ROM. The at least one memory 1025 may store computer-readable, computer-executable code 1030 including instructions that, when executed by the at least one processor 1035, cause the device 1005 to perform various functions described herein. The code 1030 may be stored in a non-transitory computer-readable medium such as system at least one memory or another type of at least one memory. In some cases, the code 1030 may not be directly executable by the at least one processor 1035 but may cause a computer (e.g., when compiled and executed) to perform functions described herein. In some cases, the at least one memory 1025 may contain, among other things, a BIOS which may control basic hardware or software operation such as the interaction with peripheral components or devices.

The at least one processor 1035 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1035 may be configured to operate a at least one memory array using a at least one memory controller. In some other cases, a at least one memory controller may be integrated into the at least one processor 1035. The at least one processor 1035 may be configured to execute computer-readable instructions stored in a at least one memory (e.g., the at least one memory 1025) to cause the device 1005 to perform various functions (e.g., functions or tasks supporting extending a non-serving cell by a repeater). For example, the device 1005 or a component of the device 1005 may include at least one processor 1035 and at least one memory 1025 coupled with or to the at least one processor 1035, the at least one processor 1035 and at least one memory 1025 configured to perform various functions described herein.

The I/O controller 1045 may manage input and output signals for the device 1005. The I/O controller 1045 may also manage peripherals not integrated into the device 1005. In some cases, the I/O controller 1045 may represent a physical connection or port to an external peripheral. In some cases, the I/O controller 1045 may utilize an operating system such as iOS®, ANDROID®, MS-DOS®, MS-WINDOWS®, OS/2®, UNIX®, LINUX®, or another known operating system. Additionally, or alternatively, the I/O controller 1045 may represent or interact with a modem, a keyboard, a mouse, a touchscreen, or a similar device. In some cases, the I/O controller 1045 may be implemented as part of at least one processor, such as the at least one processor 1035. In some cases, a user may interact with the device 1005 via the I/O controller 1045 or via hardware components controlled by the I/O controller 1045.

The communications manager 1020 may support wireless communications at a repeater wireless device in accordance with examples as disclosed herein. For example, the communications manager 1020 is capable of, configured to, or operable to support a means for receiving, from a network device, a control signal indicating that the repeater wireless device is to forward one or more messages associated with a non-serving cell of the repeater wireless device for a UE, where the network device is a serving cell of the repeater wireless device. The communications manager 1020 is capable of, configured to, or operable to support a means for forwarding the one or more messages associated with the non-serving cell for the UE via a time resource associated with the non-serving cell in accordance with the control signal.

By including or configuring the communications manager 1020 in accordance with examples as described herein, the device 1005 may support techniques for extending a non-serving cell by a repeater, which may improve communication reliability, improve communication resource utilization efficiency, reduce latency, improve device coverage, and increase signaling throughput.

In some examples, the communications manager 1020 may be configured to perform various operations (e.g., receiving, monitoring, transmitting) using or otherwise in cooperation with the transceiver 1010, the one or more antennas 1015, or any combination thereof. Although the communications manager 1020 is illustrated as a separate component, in some examples, one or more functions described with reference to the communications manager 1020 may be supported by or performed by the at least one processor 1035, the at least one memory 1025, the code 1030, or any combination thereof. For example, the code 1030 may include instructions executable by the at least one processor 1035 to cause the device 1005 to perform various aspects of extending a non-serving cell by a repeater as described herein, or the at least one processor 1035 and the at least one memory 1025 may be otherwise configured to perform or support such operations.

Figure 11:
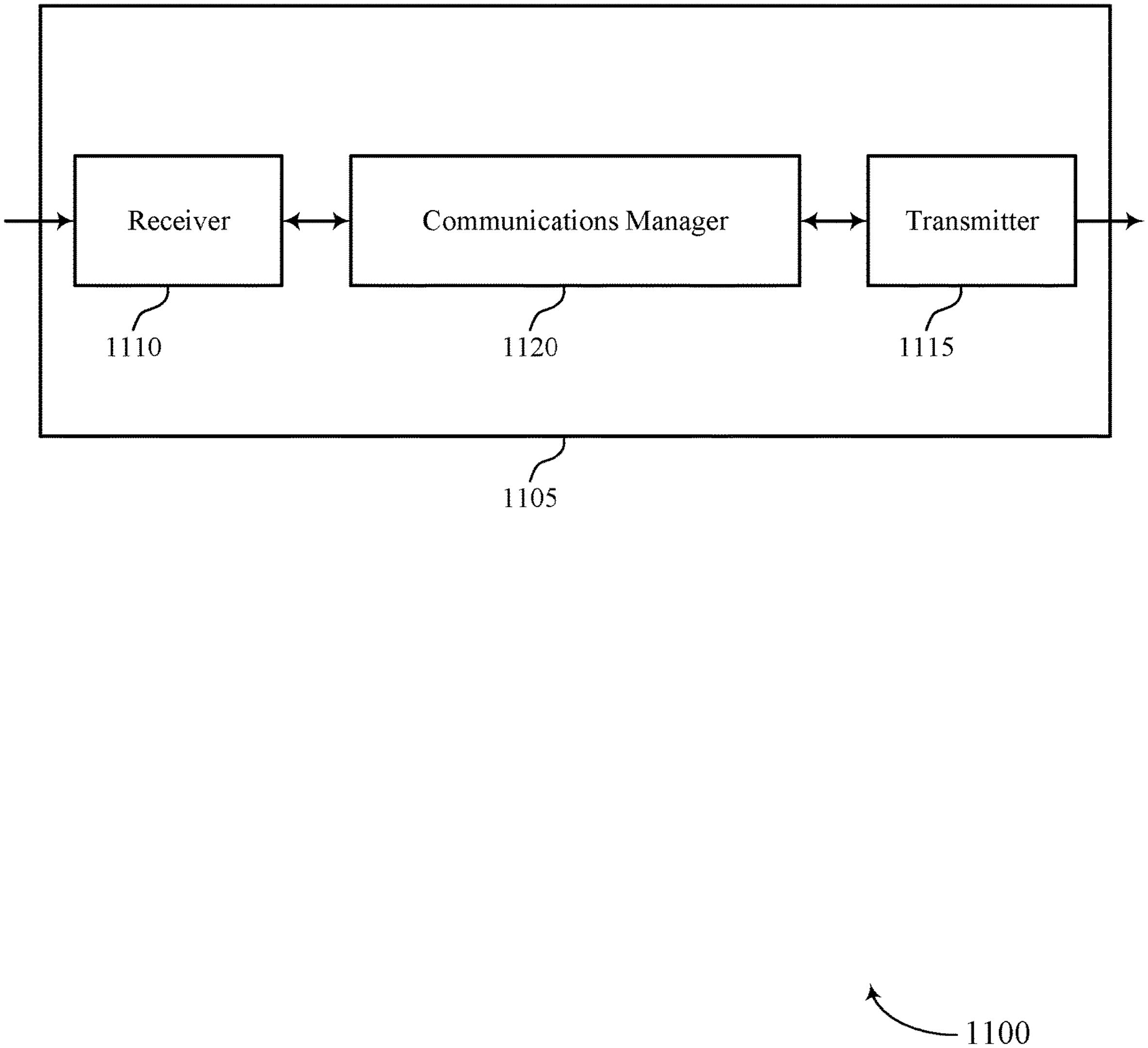
FIGS. 11 and 12 show block diagrams of devices that support extending a non-serving cell by a repeater in accordance with one or more aspects of the present disclosure.

FIG. 11 shows a block diagram 1100 of a device 1105 that supports extending a non-serving cell by a repeater in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include at least one processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of extending a non-serving cell by a repeater as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include at least one processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, in some examples, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network device in accordance with examples as disclosed herein. For example, the communications manager 1120 is capable of, configured to, or operable to support a means for outputting, for a repeater wireless device, a control signal indicating that one or more messages associated with a non-serving cell of the repeater wireless device are to be forwarded for a UE, where the network device is a serving cell of the repeater wireless device. The communications manager 1120 is capable of, configured to, or operable to support a means for outputting, for the repeater wireless device, an indication of a beam direction and a time resource associating with the non-serving cell, where the one or more messages are forwarded for the UE using the beam direction and via the time resource.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for extending a non-serving cell by a repeater, which may improve communication reliability, improve communication resource utilization efficiency, reduce latency, improve device coverage, and increase signaling throughput.

Figure 12:
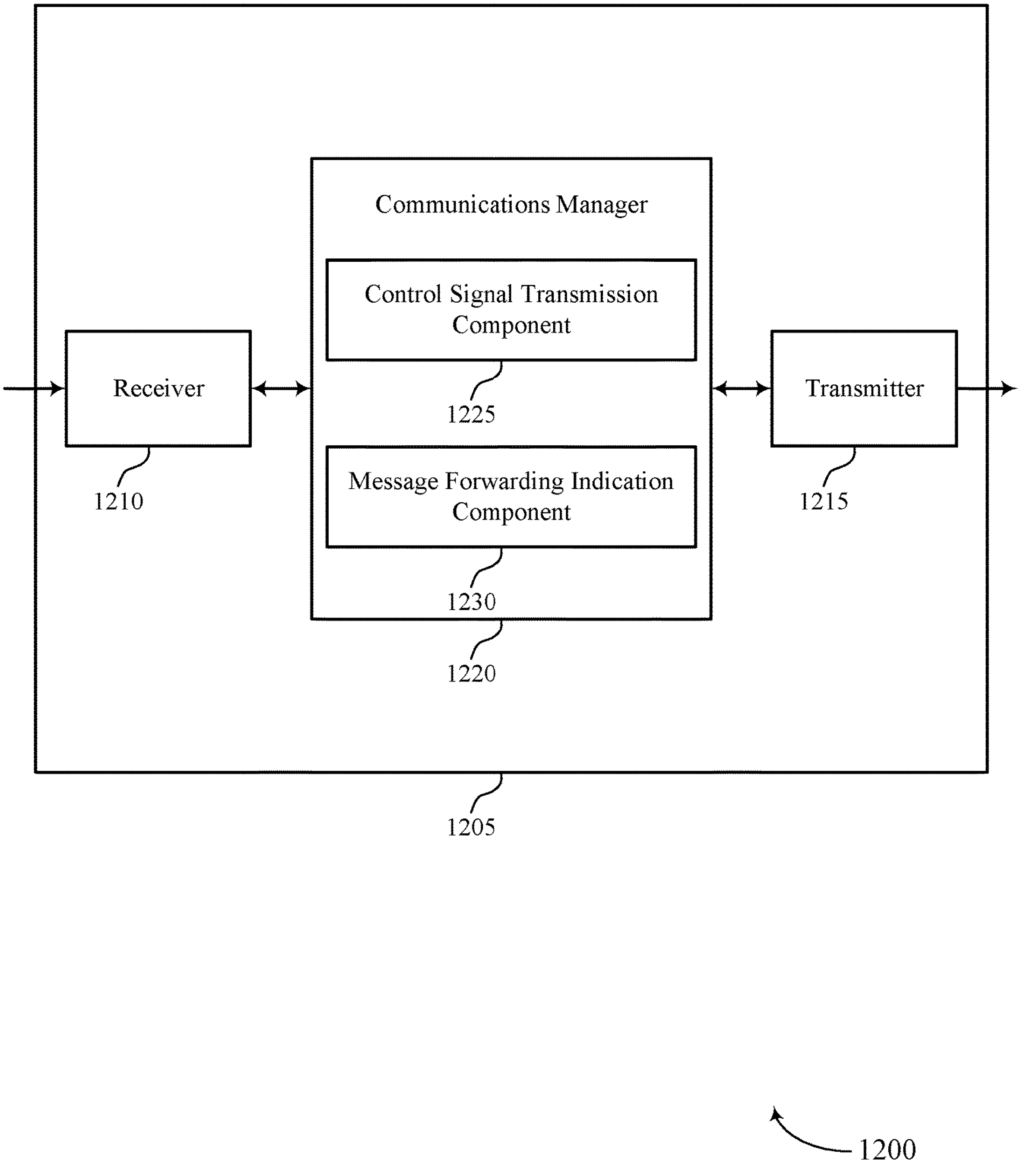

FIG. 12 shows a block diagram 1200 of a device 1205 that supports extending a non-serving cell by a repeater in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of extending a non-serving cell by a repeater as described herein. For example, the communications manager 1220 may include a control signal transmission component 1225 a message forwarding indication component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network device in accordance with examples as disclosed herein. The control signal transmission component 1225 is capable of, configured to, or operable to support a means for outputting, for a repeater wireless device, a control signal indicating that one or more messages associated with a non-serving cell of the repeater wireless device are to be forwarded for a UE, where the network device is a serving cell of the repeater wireless device. The message forwarding indication component 1230 is capable of, configured to, or operable to support a means for outputting, for the repeater wireless device, an indication of a beam direction and a time resource associated with the non-serving cell, where the one or more messages are forwarded for the UE using the beam direction and via the time resource.

Figure 13:
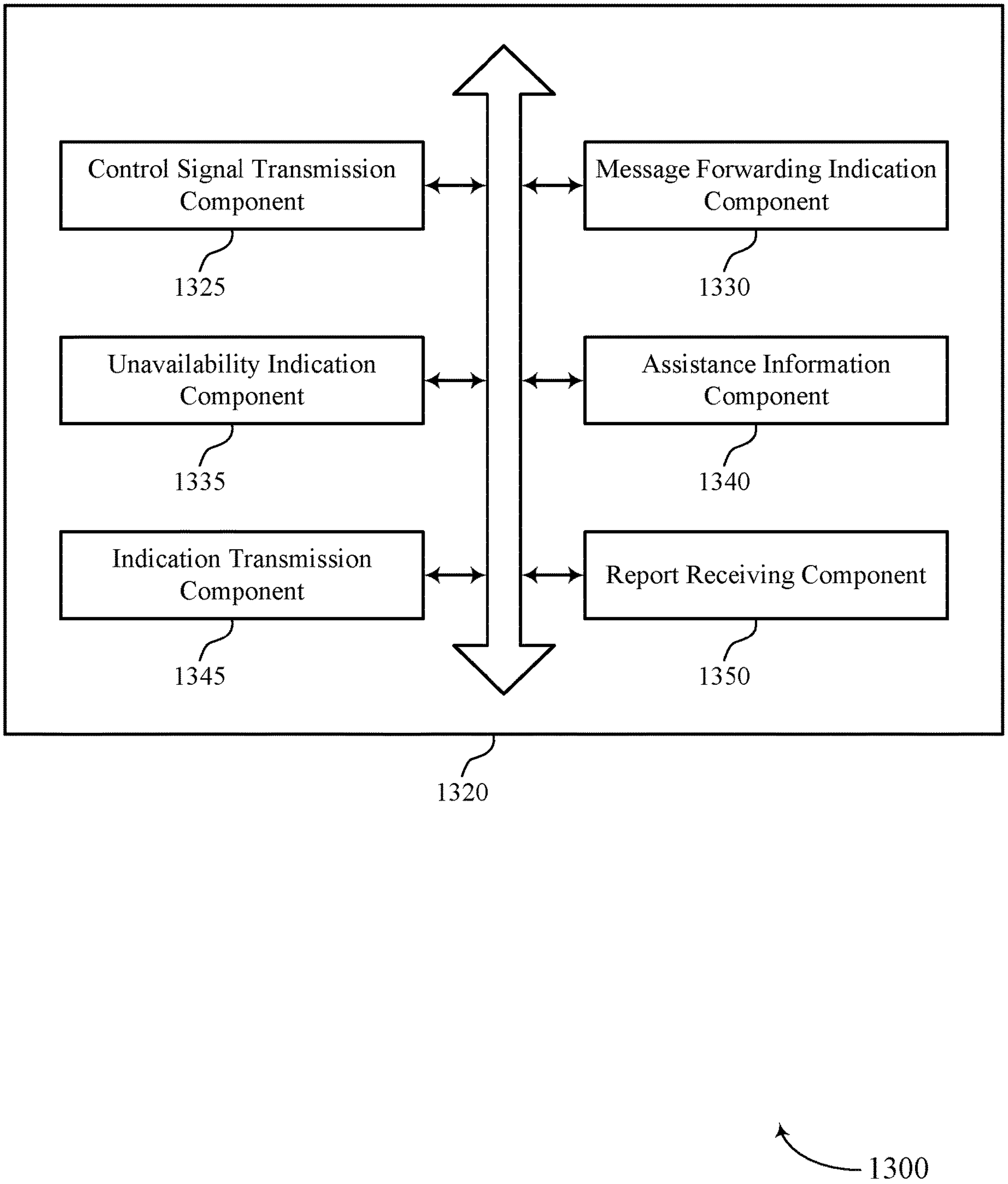
FIG. 13 shows a block diagram of a communications manager that supports extending a non-serving cell by a repeater in accordance with one or more aspects of the present disclosure.

FIG. 13 shows a block diagram 1300 of a communications manager 1320 that supports extending a non-serving cell by a repeater in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of extending a non-serving cell by a repeater as described herein. For example, the communications manager 1320 may include a control signal transmission component 1325, a message forwarding indication component 1330, an unavailability indication component 1335, an assistance information component 1340, an indication transmission component 1345, a report receiving component 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network device in accordance with examples as disclosed herein. The control signal transmission component 1325 is capable of, configured to, or operable to support a means for outputting, for a repeater wireless device, a control signal indicating that one or more messages associated with a non-serving cell of the repeater wireless device are to be forwarded for a UE, where the network device is a serving cell of the repeater wireless device. The message forwarding indication component 1330 is capable of, configured to, or operable to support a means for outputting, for the repeater wireless device, an indication of a beam direction and a time resource associated with the non-serving cell, where the one or more messages are forwarded for the UE using the beam direction and via the time resource.

In some examples, the unavailability indication component 1335 is capable of, configured to, or operable to support a means for outputting, to a DU via the time resource, an indication of an unavailability of the repeater wireless device for forwarding the one or more messages.

In some examples, the assistance information component 1340 is capable of, configured to, or operable to support a means for obtaining, from a DU, assistance information indicating an access beam associated with the non-serving cell. In some examples, the message forwarding indication component 1330 is capable of, configured to, or operable to support a means for generating the indication that the one or more messages are to be forwarded for the UE based on the assistance information. In some examples, the assistance information is associated with the UE or is device agnostic.

In some examples, to support outputting the control signal, the message forwarding indication component 1330 is capable of, configured to, or operable to support a means for obtaining, from a CU, an indication that the one or more messages are to be forwarded for the UE. In some examples, to support outputting the control signal, the indication transmission component 1345 is capable of, configured to, or operable to support a means for outputting, for the repeater wireless device, a MAC-CE or DCI indicating that the one or more messages are to be forwarded for the UE based on obtaining the indication.

In some examples, the report receiving component 1350 is capable of, configured to, or operable to support a means for obtaining, from the repeater wireless device, a report indicating one or more measurements associated with the serving cell, where receiving the control signal is based on the report. In some examples, the indication includes an identifier associated with the non-serving cell and a beam index associated with the non-serving cell.

In some examples, the indication includes a TCI state value associated with a beam of the non-serving cell. In some examples, the beam of the non-serving cell is associated with one or more of a SSB, a channel state information reference signal, or a positioning reference signal.

In some examples, the indication transmission component 1345 is capable of, configured to, or operable to support a means for outputting an indication of a configuration of the TCI state associated with the beam of the non-serving cell, where forwarding the one or more messages is based on the configuration.

In some examples, to support outputting the control signal, the indication transmission component 1345 is capable of, configured to, or operable to support a means for outputting an indication of an access beam associated with the non-serving cell, where the one or more messages are forwarded to the UE using the access beam.

In some examples, to support outputting the control signal, the indication transmission component 1345 is capable of, configured to, or operable to support a means for outputting an indication of direction of the forwarding, where the direction indicates that the repeater wireless device is to transmit the one or more messages to the UE or receive the one or more messages from the UE.

Figure 14:
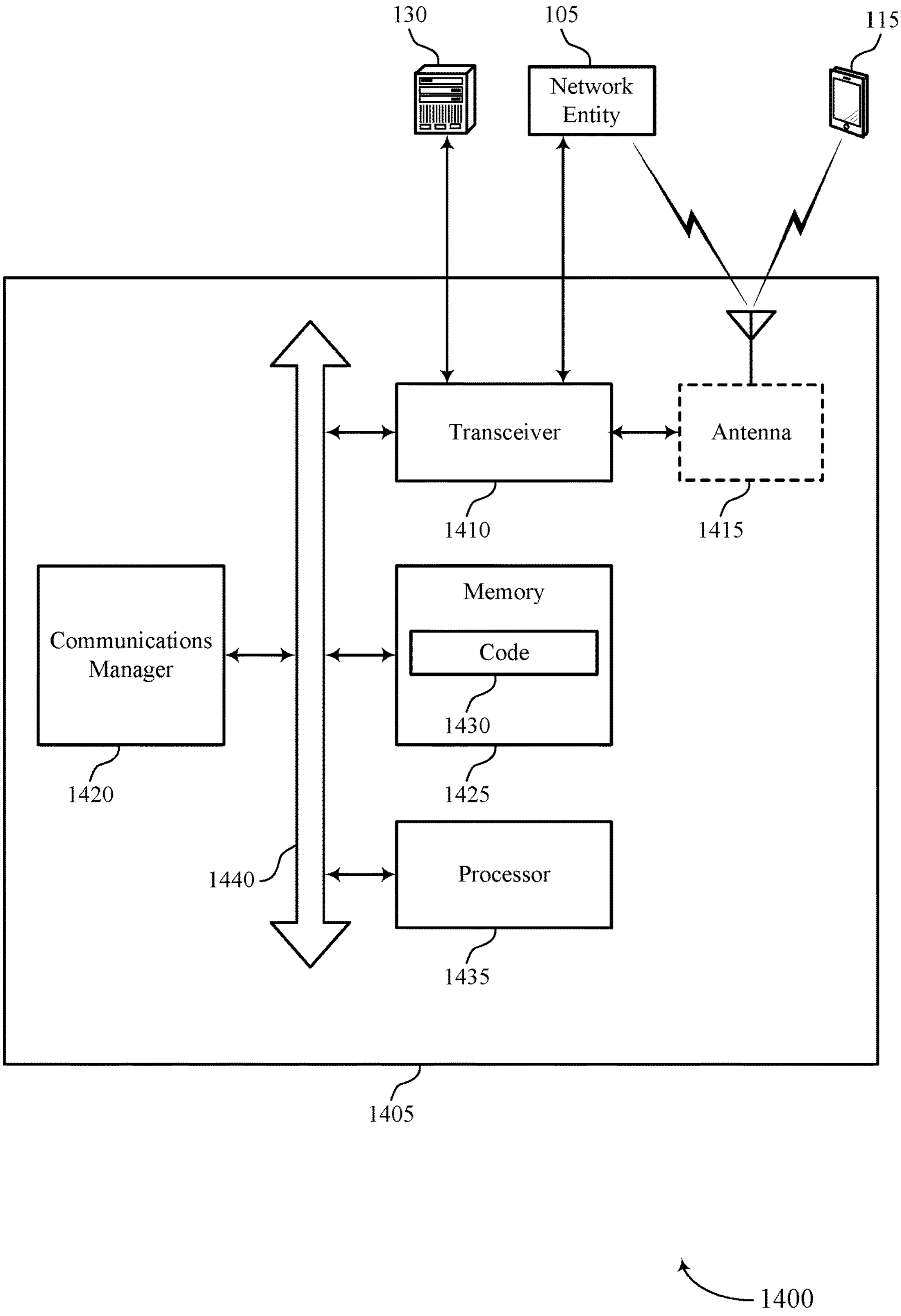
FIG. 14 shows a diagram of a system including a device that supports extending a non-serving cell by a repeater in accordance with one or more aspects of the present disclosure.

FIG. 14 shows a diagram of a system 1400 including a device 1405 that supports extending a non-serving cell by a repeater in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or at least one memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or at least one memory components (for example, the at least one processor 1435, or the at least one memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The at least one memory 1425 may include RAM and ROM. The at least one memory 1425 may store computer-readable, computer-executable code 1430 including instructions that, when executed by the at least one processor 1435, cause the device 1405 to perform various functions described herein. The code 1430 may be stored in a non-transitory computer-readable medium such as system at least one memory or another type of at least one memory. In some cases, the code 1430 may not be directly executable by the at least one processor 1435 but may cause a computer (e.g., when compiled and executed) to perform functions described herein. In some cases, the at least one memory 1425 may contain, among other things, a BIOS which may control basic hardware or software operation such as the interaction with peripheral components or devices.

The at least one processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1435 may be configured to operate a at least one memory array using a at least one memory controller. In some other cases, a at least one memory controller may be integrated into the at least one processor 1435. The at least one processor 1435 may be configured to execute computer-readable instructions stored in a at least one memory (e.g., the at least one memory 1425) to cause the device 1405 to perform various functions (e.g., functions or tasks supporting extending a non-serving cell by a repeater). For example, the device 1405 or a component of the device 1405 may include at least one processor 1435 and at least one memory 1425 coupled with the at least one processor 1435, the at least one processor 1435 and at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within the at least one memory 1425). In some implementations, the at least one processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the at least one processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network device in accordance with examples as disclosed herein. For example, the communications manager 1420 is capable of, configured to, or operable to support a means for outputting, for a repeater wireless device, a control signal indicating that one or more messages associated with a non-serving cell of the repeater wireless device are to be forwarded for a UE, where the network device is a serving cell of the repeater wireless device. The communications manager 1420 is capable of, configured to, or operable to support a means for outputting, for the repeater wireless device, an indication of a beam direction and a time resource associating with the non-serving cell, where the one or more messages are forwarded for the UE using the beam direction and via the time resource.

By including or configuring the communications manager 1420 in accordance with examples as described herein, the device 1405 may support techniques for extending a non-serving cell by a repeater, which may improve communication reliability, improve communication resource utilization efficiency, reduce latency, improve device coverage, and increase signaling throughput.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the at least one processor 1435, the at least one memory 1425, the code 1430, or any combination thereof. For example, the code 1430 may include instructions executable by the at least one processor 1435 to cause the device 1405 to perform various aspects of extending a non-serving cell by a repeater as described herein, or the at least one processor 1435 and the at least one memory 1425 may be otherwise configured to perform or support such operations.

Figure 15:
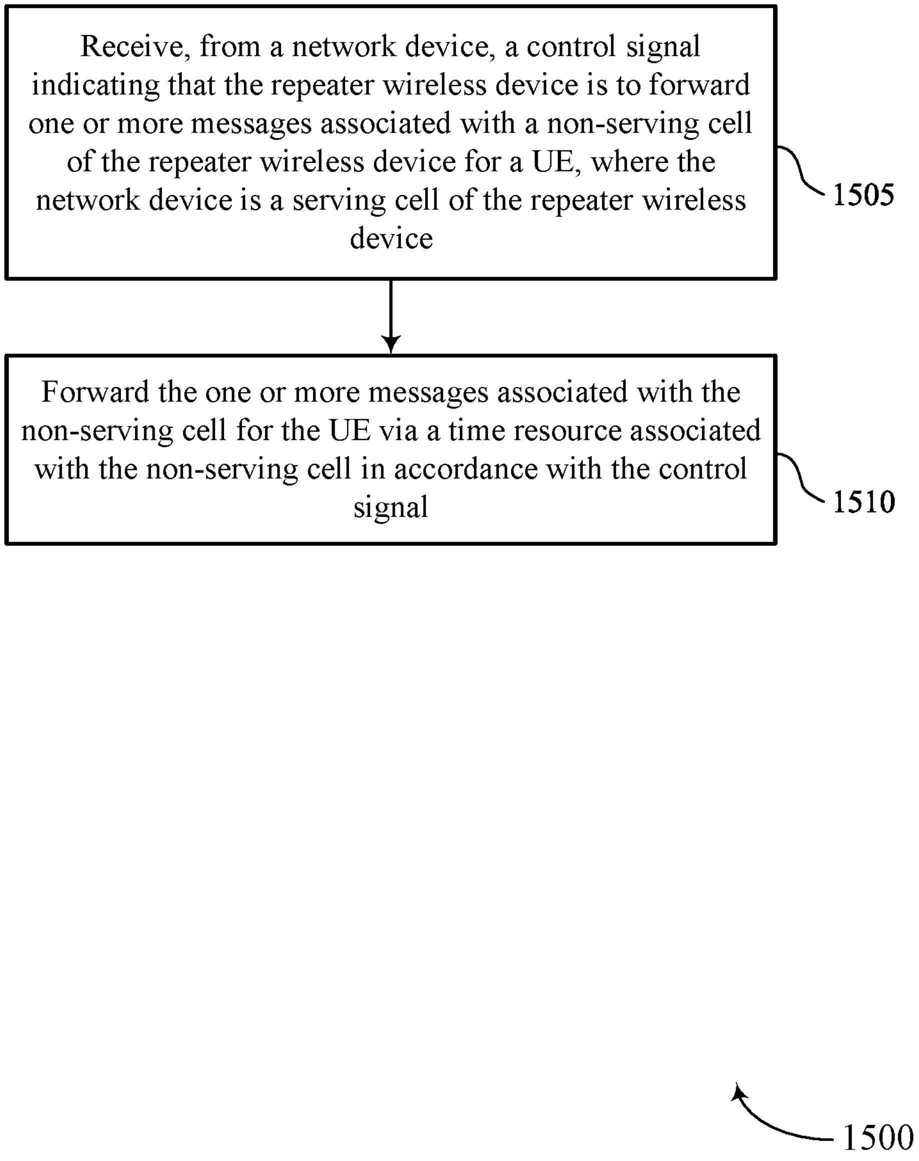
FIGS. 15 through 18 show flowcharts illustrating methods that support extending a non-serving cell by a repeater in accordance with one or more aspects of the present disclosure.

FIG. 15 shows a flowchart illustrating a method 1500 that supports extending a non-serving cell by a repeater in accordance with aspects of the present disclosure. The operations of the method 1500 may be implemented by a repeater wireless device or its components as described herein. For example, the operations of the method 1500 may be performed by a repeater wireless device as described with reference to FIGS. 1 through 10. In some examples, a repeater wireless device may execute a set of instructions to control the functional elements of the repeater wireless device to perform the described functions. Additionally, or alternatively, the repeater wireless device may perform aspects of the described functions using special-purpose hardware.

At 1505, the method may include receiving, from a network device, a control signal indicating that the repeater wireless device is to forward one or more messages associated with a non-serving cell of the repeater wireless device for a UE, where the network device is a serving cell of the repeater wireless device. The operations of block 1505 may be performed in accordance with examples as disclosed herein. In some examples, aspects of the operations of 1505 may be performed by a control signal component 925 as described with reference to FIG. 9.

At 1510, the method may include forwarding the one or more messages associated with the non-serving cell for the UE via a time resource associated with the non-serving cell in accordance with the control signal. The operations of block 1510 may be performed in accordance with examples as disclosed herein. In some examples, aspects of the operations of 1510 may be performed by a forwarding component 930 as described with reference to FIG. 9.

Figure 16:
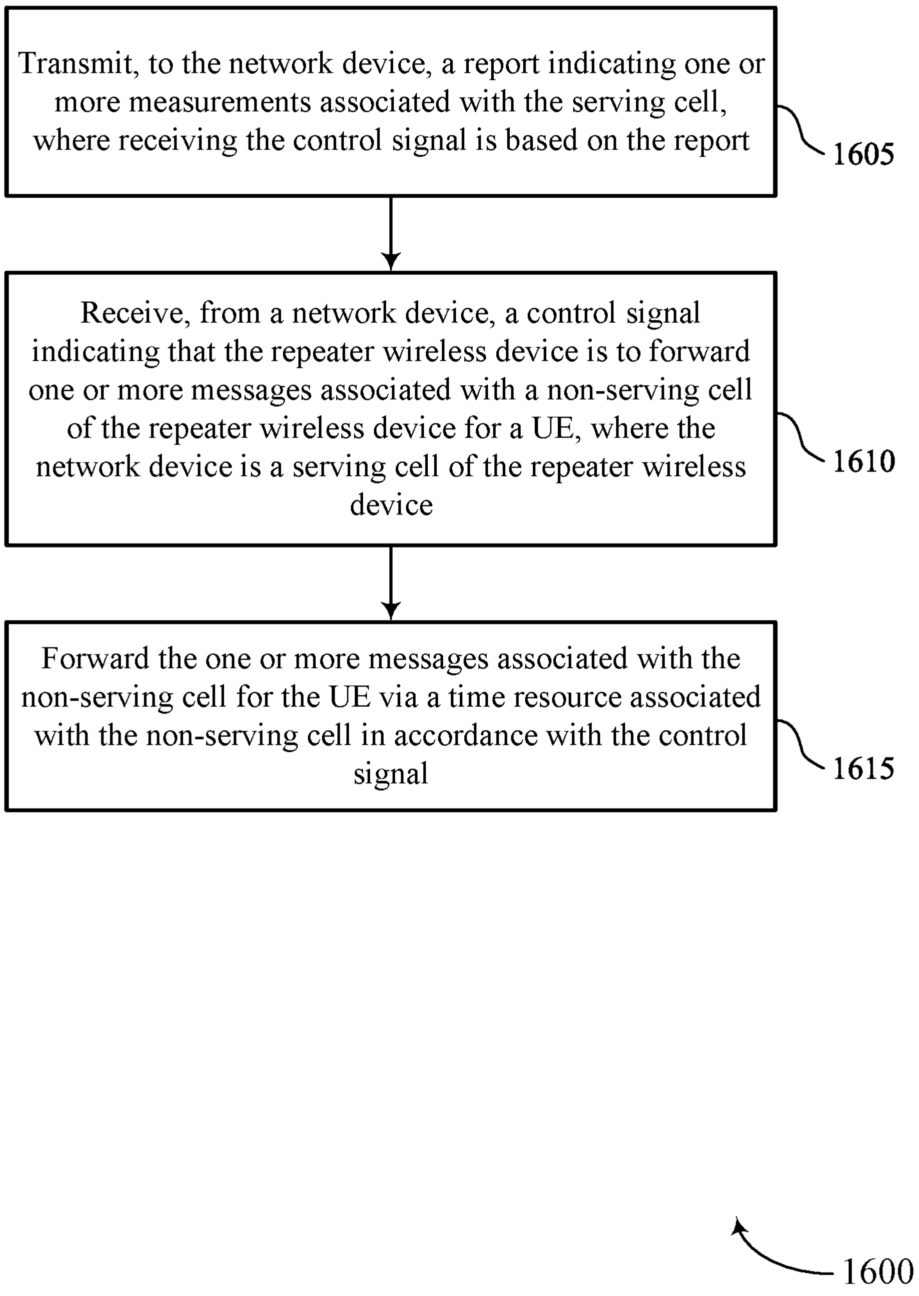

FIG. 16 shows a flowchart illustrating a method 1600 that supports extending a non-serving cell by a repeater in accordance with aspects of the present disclosure. The operations of the method 1600 may be implemented by a repeater wireless device or its components as described herein. For example, the operations of the method 1600 may be performed by a repeater wireless device as described with reference to FIGS. 1 through 10. In some examples, a repeater wireless device may execute a set of instructions to control the functional elements of the repeater wireless device to perform the described functions. Additionally, or alternatively, the repeater wireless device may perform aspects of the described functions using special-purpose hardware.

At 1605, the method may include transmitting, to the network device, a report indicating one or more measurements associated with the serving cell, where receiving the control signal is based on the report. The operations of block 1605 may be performed in accordance with examples as disclosed herein. In some examples, aspects of the operations of 1605 may be performed by a report component 935 as described with reference to FIG. 9.

At 1610, the method may include receiving, from a network device, a control signal indicating that the repeater wireless device is to forward one or more messages associated with a non-serving cell of the repeater wireless device for a UE, where the network device is a serving cell of the repeater wireless device. The operations of block 1610 may be performed in accordance with examples as disclosed herein. In some examples, aspects of the operations of 1610 may be performed by a control signal component 925 as described with reference to FIG. 9.

At 1615, the method may include forwarding the one or more messages associated with the non-serving cell for the UE via a time resource associated with the non-serving cell in accordance with the control signal. The operations of block 1615 may be performed in accordance with examples as disclosed herein. In some examples, aspects of the operations of 1615 may be performed by a forwarding component 930 as described with reference to FIG. 9.

Figure 17:
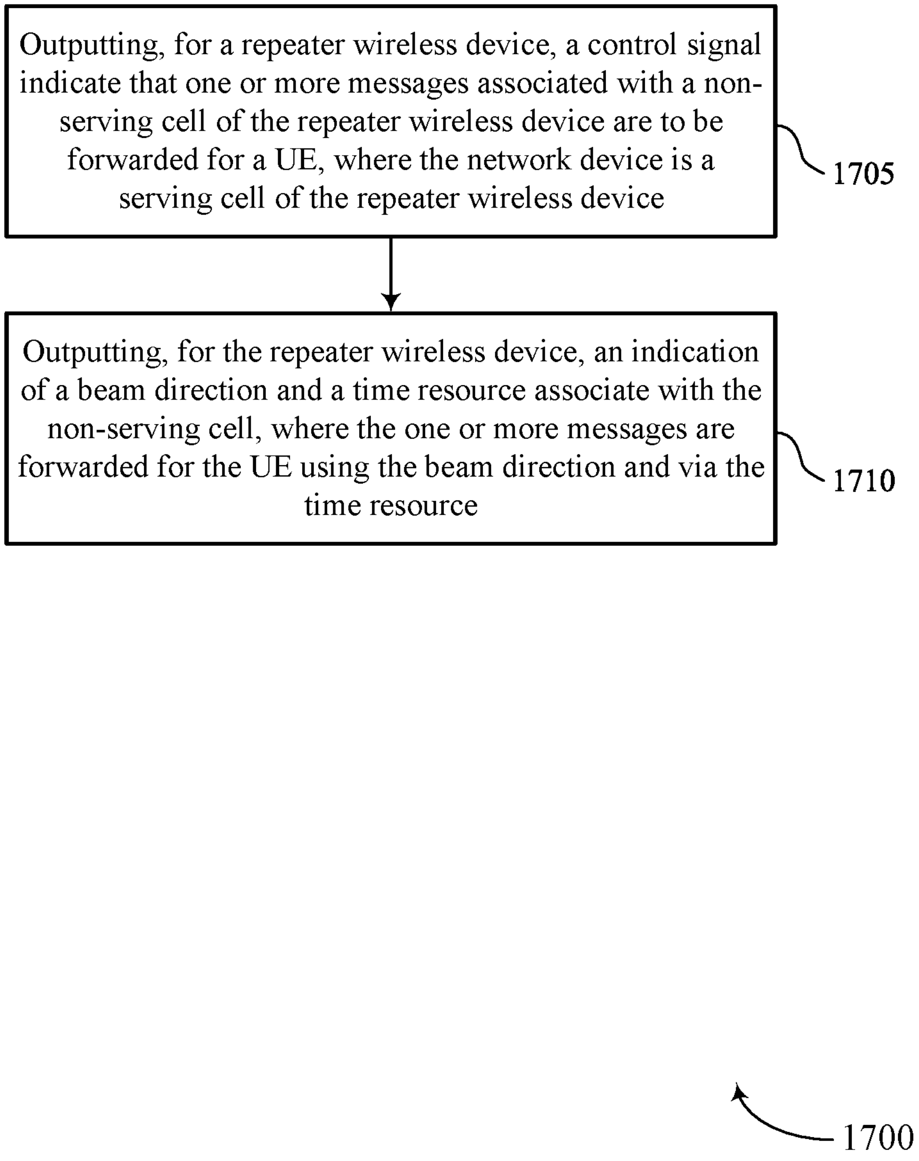

FIG. 17 shows a flowchart illustrating a method 1700 that supports extending a non-serving cell by a repeater in accordance with aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include outputting, for a repeater wireless device, a control signal indicating that one or more messages associated with a non-serving cell of the repeater wireless device are to be forwarded for a UE, where the network device is a serving cell of the repeater wireless device. The operations of block 1705 may be performed in accordance with examples as disclosed herein. In some examples, aspects of the operations of 1705 may be performed by a control signal transmission component 1325 as described with reference to FIG. 13.

At 1710, the method may include outputting, for the repeater wireless device, an indication of a beam direction and a time resource associated with the non-serving cell, where the one or more messages are forwarded for the UE using the beam direction and via the time resource. The operations of block 1710 may be performed in accordance with examples as disclosed herein. In some examples, aspects of the operations of 1710 may be performed by a message forwarding indication component 1330 as described with reference to FIG. 13.

Figure 18:
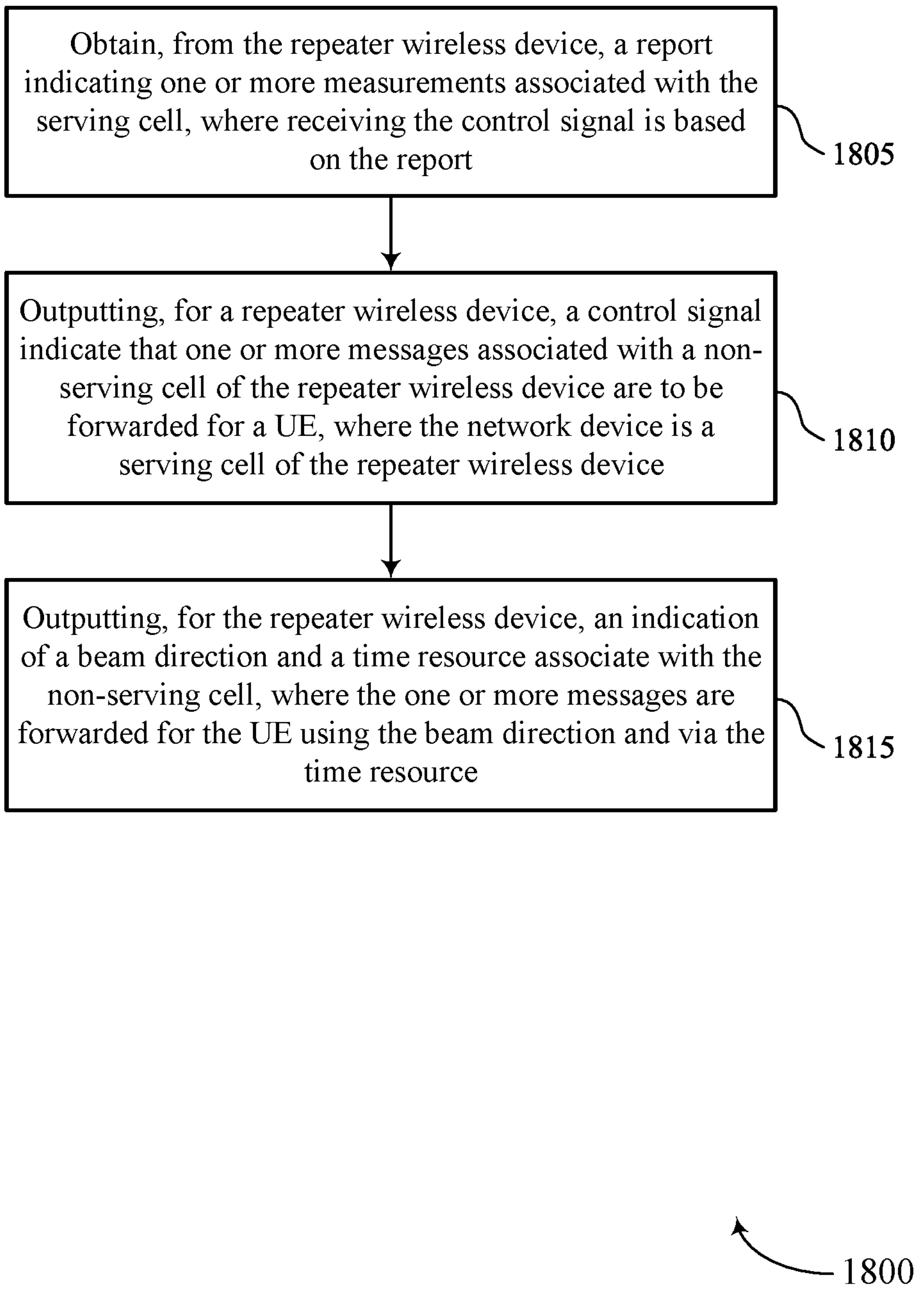

FIG. 18 shows a flowchart illustrating a method 1800 that supports extending a non-serving cell by a repeater in accordance with aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include obtaining, from the repeater wireless device, a report indicating one or more measurements associated with the serving cell, where receiving the control signal is based on the report. The operations of block 1805 may be performed in accordance with examples as disclosed herein. In some examples, aspects of the operations of 1805 may be performed by a report receiving component 1350 as described with reference to FIG. 13.

At 1810, the method may include outputting, for a repeater wireless device, a control signal indicating that one or more messages associated with a non-serving cell of the repeater wireless device are to be forwarded for a UE, where the network device is a serving cell of the repeater wireless device. The operations of block 1810 may be performed in accordance with examples as disclosed herein. In some examples, aspects of the operations of 1810 may be performed by a control signal transmission component 1325 as described with reference to FIG. 13.

At 1815, the method may include outputting, for the repeater wireless device, an indication of a beam direction and a time resource associated with the non-serving cell, where the one or more messages are forwarded for the UE using the beam direction and via the time resource. The operations of block 1815 may be performed in accordance with examples as disclosed herein. In some examples, aspects of the operations of 1815 may be performed by a message forwarding indication component 1330 as described with reference to FIG. 13.

The following provides an overview of aspects of the present disclosure:

Aspect 1: A method for wireless communications at a repeater wireless device, comprising: receiving, from a network device, a control signal indicating that the repeater wireless device is to forward one or more messages associated with a non-serving cell of the repeater wireless device for a UE, wherein the network device is a serving cell of the repeater wireless device; and forwarding the one or more messages associated with the non-serving cell for the UE via a time resource associated with the non-serving cell in accordance with the control signal.

Aspect 2: The method of aspect 1, further comprising: transmitting, to the network device, a report indicating one or more measurements associated with the serving cell, wherein receiving the control signal is based at least in part on the report.

Aspect 3: The method of any of aspects 1 through 2, wherein receiving the control signal comprises: receiving an indication of a beam direction associated with the non-serving cell and an indication of the time resource.

Aspect 4: The method of aspect 3, wherein the indication includes an identifier associated with the non-serving cell and a beam index associated with the non-serving cell.

Aspect 5: The method of any of aspects 3 through 4, wherein the indication includes a value of a TCI state associated with a beam of the non-serving cell, the beam of the non-serving cell is associated with one or more of an SSB, a CSI-RS, or a PRS.

Aspect 6: The method of aspect 5, further comprising: receiving an indication of a configuration of the TCI state associated with the beam of the non-serving cell, wherein forwarding the one or more messages is based at least in part on the configuration.

Aspect 7: The method of any of aspects 1 through 6, wherein receiving the control signal comprises: receiving an indication of an access beam associated with the non-serving cell, wherein the one or more messages are forwarded to the UE using the access beam.

Aspect 8: The method of any of aspects 1 through 7, wherein receiving the control signal comprises: receiving an indication of direction of the forwarding, wherein the direction indicates that the repeater wireless device is to transmit the one or more messages to the UE or receive the one or more messages from the UE.

Aspect 9: A method for wireless communications at a network device, comprising: outputting, for a repeater wireless device, a control signal indicating that one or more messages associated with a non-serving cell of the repeater wireless device are to be forwarded for a UE, wherein the network device is a serving cell of the repeater wireless device; and outputting, for the repeater wireless device, an indication of a beam direction and a time resource associated with the non-serving cell, wherein the one or more messages are forwarded for the UE using the beam direction and via the time resource.

Aspect 10: The method of aspect 9, wherein the network device is a centralized unit, further comprising: outputting, to a distributed unit via the time resource, an indication of an unavailability of the repeater wireless device for forwarding the one or more messages.

Aspect 11: The method of any of aspects 9 through 10, wherein the network device is a centralized unit, further comprising: obtaining, from a distributed unit, assistance information indicating an access beam associated with the non-serving cell; and generating the indication that the one or more messages are to be forwarded for the UE based at least in part the assistance information.

Aspect 12: The method of aspect 11, wherein the assistance information is associated with the UE or is device agnostic.

Aspect 13: The method of any of aspects 9 through 12, wherein the network device is a distributed unit, and wherein outputting the control signal comprises: obtaining, from a centralized unit, an indication that the one or more messages are to be forwarded for the UE; and outputting, for the repeater wireless device, a MAC-CE or DCI indicating that the one or more messages are to be forwarded for the UE based at least in part on obtaining the indication.

Aspect 14: The method of any of aspects 9 through 13, further comprising: obtaining, from the repeater wireless device, a report indicating one or more measurements associated with the serving cell, wherein receiving the control signal is based at least in part on the report.

Aspect 15: The method of any of aspects 9 through 14, wherein the indication includes an identifier associated with the non-serving cell and a beam index associated with the non-serving cell.

Aspect 16: The method of any of aspects 9 through 15, wherein the indication includes a TCI state value associated with a beam of the non-serving cell, the beam of the non-serving cell is associated with one or more of an SSB, a CSI-RS, or a PRS.

Aspect 17: The method of aspect 16, further comprising: outputting an indication of a configuration of the TCI state associated with the beam of the non-serving cell, wherein forwarding the one or more messages is based at least in part on the configuration.

Aspect 18: The method of any of aspects 9 through 17, wherein outputting the control signal comprises: outputting an indication of an access beam associated with the non-serving cell, wherein the one or more messages are forwarded to the UE using the access beam.

Aspect 19: The method of any of aspects 9 through 18, wherein outputting the control signal comprises: outputting an indication of direction of the forwarding, wherein the direction indicates that the repeater wireless device is to transmit the one or more messages to the UE or receive the one or more messages from the UE.

Aspect 20: An apparatus for wireless communications at a repeater wireless device, comprising at least one processor; at least one at least one memory coupled with the at least one processor; and instructions stored in the at least one at least one memory and executable by the at least one processor to cause the apparatus to perform a method of any of aspects 1 through 8.

Aspect 21: An apparatus for wireless communications at a repeater wireless device, comprising at least one means for performing a method of any of aspects 1 through 8.

Aspect 22: A non-transitory computer-readable medium storing code for wireless communications at a repeater wireless device, the code comprising instructions executable by at least one processor to perform a method of any of aspects 1 through 8.

Aspect 23: An apparatus for wireless communications at a network device, comprising at least one processor; at least one at least one memory coupled with the at least one processor; and instructions stored in the at least one at least one memory and executable by the at least one processor to cause the apparatus to perform a method of any of aspects 9 through 19.

Aspect 24: An apparatus for wireless communications at a network device, comprising at least one means for performing a method of any of aspects 9 through 19.

Aspect 25: A non-transitory computer-readable medium storing code for wireless communications at a network device, the code comprising instructions executable by at least one processor to perform a method of any of aspects 9 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the at least one processor may be any processor, controller, microcontroller, or state machine. At least one processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by at least one processor, firmware, or any combination thereof. If implemented using software executed by at least one processor, the functions may be stored as or transmitted using one or more instructions or code of a computer-readable medium. Other examples and implementations are within the scope of the disclosure and appended claims. For example, due to the nature of software, functions described herein may be implemented using software executed by at least one processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash at least one memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in at least one memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a repeater wireless device, comprising:

at least one processor; and at least one memory coupled with the at least one processor, the at least one processor configured to:

receive, from a network device, a control signal comprising an indication of an access beam associated with a non-serving cell of the repeater wireless device and an indication that the repeater wireless device is to forward one or more messages associated with the non-serving cell of the repeater wireless device for a user equipment (UE), wherein the network device is a serving cell of the repeater wireless device; and forward the one or more messages associated with the non-serving cell for the UE using the access beam and via a time resource associated with the non-serving cell in accordance with the control signal.

2. The apparatus of claim 1, wherein the at least one processor is configured to:

transmit, to the network device, a report indicating one or more measurements associated with the serving cell, wherein receiving the control signal is based at least in part on the report.

3. The apparatus of claim 1, wherein the at least one processor configured to receive the control signal is further configured to:

receive an indication of a beam direction associated with the non-serving cell and an indication of the time resource.

4. The apparatus of claim 3, wherein the indication includes an identifier associated with the non-serving cell and a beam index associated with the non-serving cell.

5. The apparatus of claim 3, wherein the indication includes a value of a transmission configuration indicator state associated with a beam of the non-serving cell, wherein the beam of the non-serving cell is associated with one or more of a synchronization signal block, a channel state information reference signal, or a positioning reference signal.

6. The apparatus of claim 5, wherein the at least one processor is configured to:

receive an indication of a configuration of the transmission configuration indicator state associated with the beam of the non-serving cell, wherein forwarding the one or more messages is based at least in part on the configuration.

7. The apparatus of claim 1, wherein the at least one processor configured to receive the control signal is further configured to:

receive an indication of direction of the forwarding, wherein the direction indicates that the repeater wireless device is to transmit the one or more messages to the UE or receive the one or more messages from the UE.

8. An apparatus for wireless communications at a network device, comprising:

at least one processor; and at least one memory coupled with the at least one processor, the at least one processor configured to:

obtain, from a distributed unit, assistance information indicating an access beam associated with a non-serving cell of a repeater wireless device;

generate an indication that one or more messages associated with the non-serving cell of the repeater wireless device are to be forwarded for a user equipment (UE) based at least in part on the assistance information;

output, for the repeater wireless device, a control signal comprising the indication that the one or more messages associated with serving cell of the repeater wireless device are to be forwarded for the UE, wherein the network device is a serving cell of the repeater wireless device; and output, for the repeater wireless device, an indication of a beam direction and a time resource associated with the non-serving cell, wherein the one or more messages are forwarded for the UE using the beam direction and via the time resource.

9. The apparatus of claim 8, wherein the at least one processor is configured to:

output, to a distributed unit via the time resource, an indication of an unavailability of the repeater wireless device for forwarding the one or more messages.

10. The apparatus of claim 8, wherein the assistance information is associated with the UE or is device agnostic.

11. The apparatus of claim 8, wherein the at least one processor configured to output the control signal is further configured to:

obtain, from a centralized unit, an indication that the one or more messages are to be forwarded for the UE; and outputting, for the repeater wireless device, a medium access control control element or downlink control information indicating that the one or more messages are to be forwarded for the UE based at least in part on obtaining the indication.

12. The apparatus of claim 8, wherein the at least one processor is configured to:

obtain, from the repeater wireless device, a report indicating one or more measurements associated with the serving cell, wherein receiving the control signal is based at least in part on the report.

13. The apparatus of claim 8, wherein the indication includes an identifier associated with the non-serving cell and a beam index associated with the non-serving cell.

14. The apparatus of claim 8, wherein the indication includes a transmission configuration indicator state value associated with a beam of the non-serving cell, wherein the beam of the non-serving cell is associated with one or more of a synchronization signal block, a channel state information reference signal, or a positioning reference signal.

15. The apparatus of claim 14, wherein the at least one processor is configured to:

output an indication of a configuration of the transmission configuration indicator state value associated with the beam of the non-serving cell, wherein forwarding the one or more messages is based at least in part on the configuration.

16. The apparatus of claim 8, wherein the at least one processor configured to output the control signal is further configured to:

output an indication of an access beam associated with the non-serving cell, wherein the one or more messages are forwarded to the UE using the access beam.

17. The apparatus of claim 8, wherein the at least one processor configured to output the control signal is further configured to:

output an indication of direction of the forwarding, wherein the direction indicates that the repeater wireless device is to transmit the one or more messages to the UE or receive the one or more messages from the UE.

18. A method for wireless communications at a repeater wireless device, comprising:

receiving, from a network device, a control signal comprising an indication of an access beam associated with a non-serving cell of the repeater wireless device and an indication that the repeater wireless device is to forward one or more messages associated with the non-serving cell of the repeater wireless device for a user equipment (UE), wherein the network device is a serving cell of the repeater wireless device; and forwarding the one or more messages associated with the non-serving cell for the UE using the access beam and via a time resource associated with the non-serving cell in accordance with the control signal.

19. The method of claim 18, further comprising:

transmitting, to the network device, a report indicating one or more measurements associated with the serving cell, wherein receiving the control signal is based at least in part on the report.

20. The method of claim 18, wherein receiving the control signal comprises:

receiving an indication of a beam direction associated with the non-serving cell and an indication of the time resource.

21. The method of claim 20, wherein the indication includes an identifier associated with the non-serving cell and a beam index associated with the non-serving cell.

22. The method of claim 20, wherein the indication includes a value of a transmission configuration indicator state associated with a beam of the non-serving cell, wherein the beam of the non-serving cell is associated with one or more of a synchronization signal block, a channel state information reference signal, or a positioning reference signal.

23. The method of claim 22, further comprising:

receiving an indication of a configuration of the transmission configuration indicator state associated with the beam of the non-serving cell, wherein forwarding the one or more messages is based at least in part on the configuration.

24. A method for wireless communications at a network device, comprising:

obtaining, from a distributed unit, assistance information indicating an access beam associated with a non-serving cell of a repeater wireless device;

generating an indication that one or more messages associated with the non-serving cell of the repeater wireless device are to be forwarded for a user equipment (UE) based at least in part on the assistance information;

outputting, for the repeater wireless device, a control signal comprising the indication that the one or more messages associated with the non-serving cell of the repeater wireless device are to be forwarded for the UE, wherein the network device is a serving cell of the repeater wireless device; and outputting, for the repeater wireless device, an indication of a beam direction and a time resource associated with the non-serving cell, wherein the one or more messages are forwarded for the UE using the beam direction and via the time resource.

25. The method of claim 24, wherein the network device is a centralized unit, further comprising:

outputting, to a distributed unit via the time resource, an indication of an unavailability of the repeater wireless device for forwarding the one or more messages.

26. The method of claim 24, wherein the assistance information is associated with the UE or is device agnostic.

27. The method of claim 24, wherein the network device is a distributed unit, and wherein outputting the control signal comprises:

obtaining, from a centralized unit, an indication that the one or more messages are to be forwarded for the UE; and outputting, for the repeater wireless device, a medium access control control element or downlink control information indicating that the one or more messages are to be forwarded for the UE based at least in part on obtaining the indication.

* * * * *